(12) United States Patent
Gustafson et al.

(10) Patent No.: US 7,225,680 B2
(45) Date of Patent: Jun. 5, 2007

(54) DIFFERENTIAL PRESSURE GAUGE FOR FILTER

(75) Inventors: Michael Jon Gustafson, Burnsville, MN (US); John R. Hacker, Bloomington, MN (US); John F. Connelly, Chanhassen, MN (US); Gus E. Breiland, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 9 days.

(21) Appl. No.: 11/011,400

(22) Filed: Dec. 13, 2004

(65) Prior Publication Data

US 2005/0150304 A1  Jul. 14, 2005

Related U.S. Application Data

(63) Continuation-in-part of application No. 10/031,030, filed on May 28, 2002, now abandoned.

(51) Int. Cl.
*G01L 9/00* (2006.01)

(52) U.S. Cl. ...................................................... 73/754
(58) Field of Classification Search .......... 73/715–728, 73/732–743
See application file for complete search history.

(56) References Cited

U.S. PATENT DOCUMENTS

| 4,109,510 A | * | 8/1978 | Rodder ........................ 73/23.4 |
| 4,569,220 A | * | 2/1986 | Hopfe et al. .................. 73/1.17 |
| 5,024,294 A | * | 6/1991 | Van Fossen et al. ......... 184/108 |
| 5,133,323 A | * | 7/1992 | Treusch ....................... 123/494 |
| 6,981,421 B2 | * | 1/2006 | Palmer et al. ................. 73/735 |

* cited by examiner

*Primary Examiner*—Jewel Thompson
(74) *Attorney, Agent, or Firm*—Merchant & Gould P.C.

(57) ABSTRACT

An apparatus for measuring the differential pressure of fluid in filter. The apparatus comprises a housing defining a pressure chamber. A differential pressure gauge divides the pressure chamber into first and second fluid chambers. The differential pressure gauge is arranged to measure a differential pressure between fluid in the first chamber and fluid in the second chamber. The differential pressure gauge has a variable output.

20 Claims, 27 Drawing Sheets

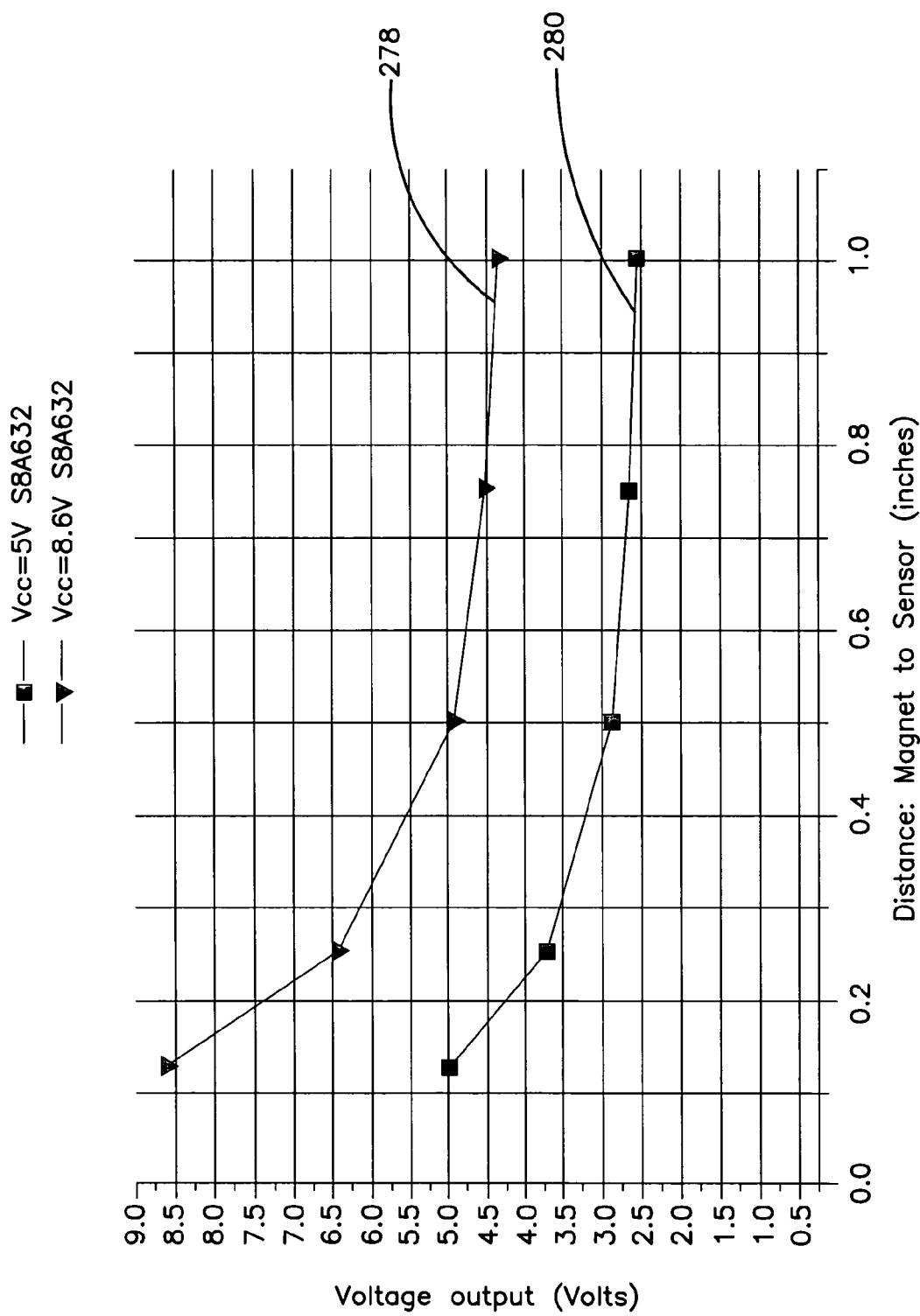

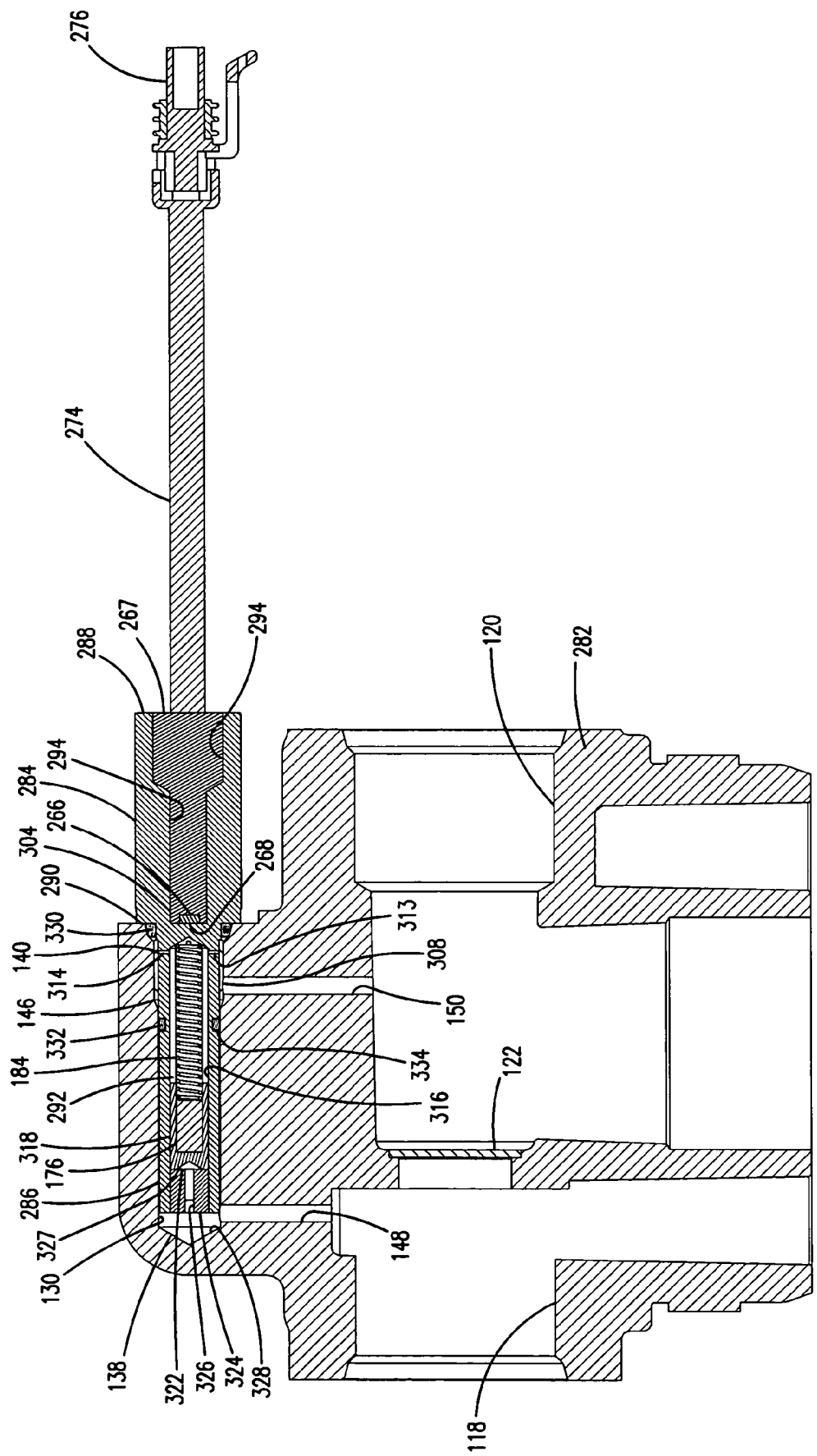

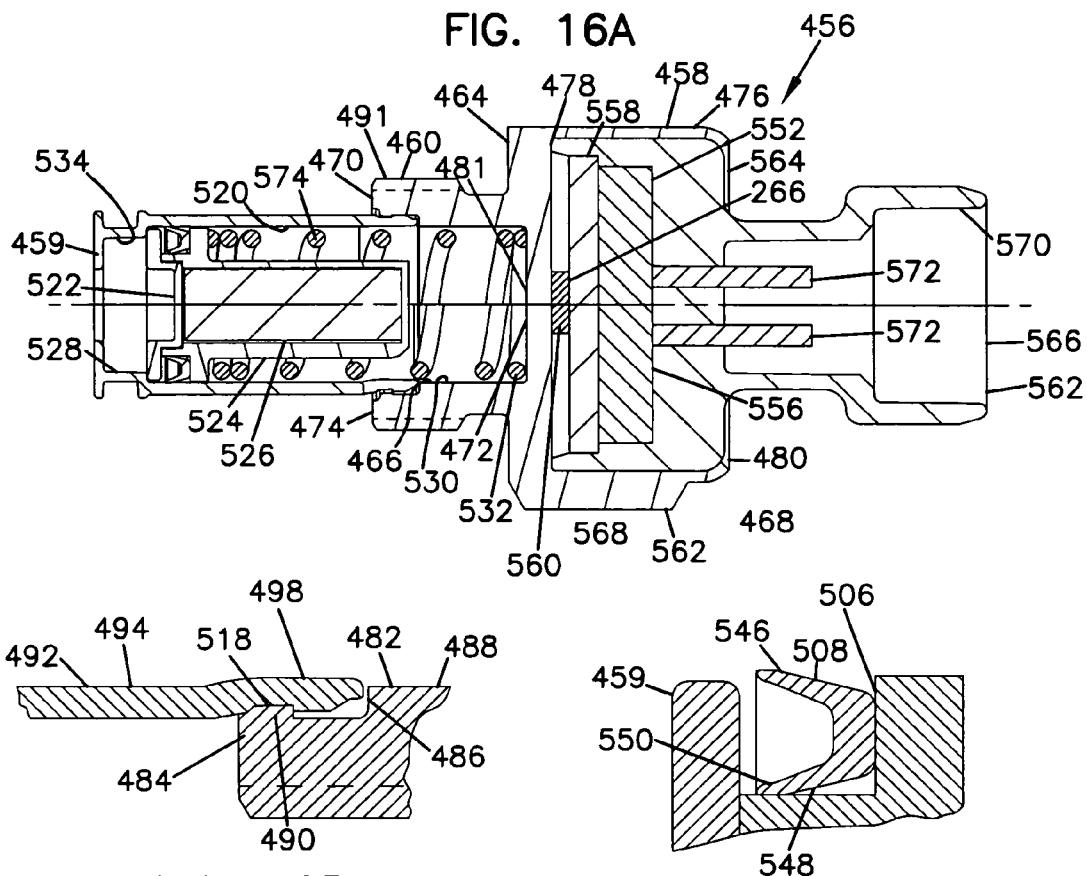
FIG. 16A
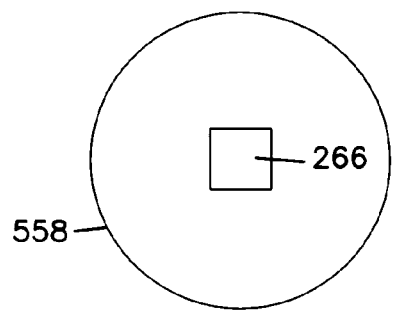
FIG. 16B
FIG. 16C
FIG. 17
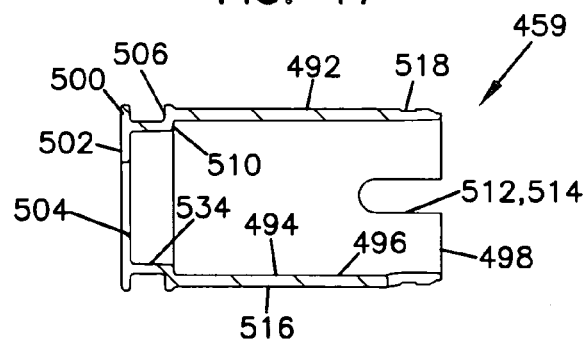
FIG. 18

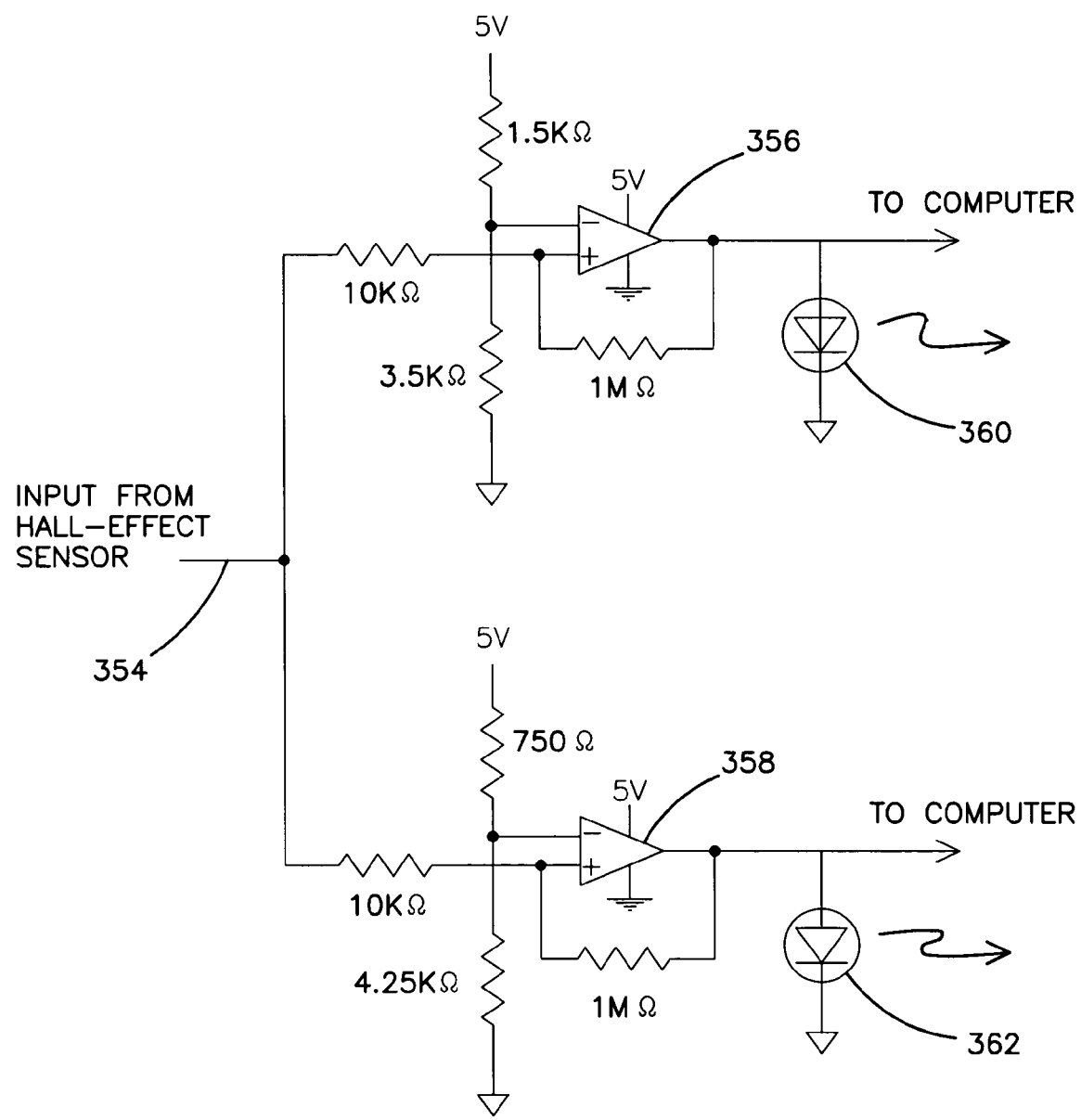

TABLES OF SELECTED SENSOR AND SUPPLY VOLTAGE
VERSUS SENSOR DISTANCE

384a

| SENSOR OUTPUT VOLTAGE COLUMN | SENSOR DISTANCE COLUMN |
|---|---|
| WORD (0) | WORD (0) |
| WORD(1) | WORD(1) |
| WORD(2) | WORD(2) |
| WORD(3) | WORD(3) |
| WORD(4) | WORD(4) |
| WORD(5) | WORD(5) |
| WORD(I) | WORD(I) |
| WORD(I+1) | WORD(I+1) |
| WORD(N) | WORD(N) |

TABLES OF SENSOR DISTANCE VERSUS PRESSURE

384b

| SENSOR DISTANCE COLUMN | PRESSURE COLUMN |
|---|---|
| WORD (0) | WORD (0) |
| WORD(1) | WORD(1) |
| WORD(2) | WORD(2) |
| WORD(3) | WORD(3) |
| WORD(4) | WORD(4) |
| WORD(5) | WORD(5) |
| WORD(I) | WORD(I) |
| WORD(I+1) | WORD(I+1) |
| WORD(N) | WORD(N) |

DIFFERENTIAL PRESSURE GAUGE FOR FILTER

REFERENCE TO CO-PENDING APPLICATION

This is a Continuation-in-Part of U.S. patent application Ser. No. 10/031,030 filed May 28, 2002 now abandoned, which claims priority to PCT/US00/19466, filed Jul. 14, 2000, which claims priority to U.S. patent application Ser. No. 09/357,533, filed Jul. 19, 1999, the disclosures of which are incorporated by reference

TECHNICAL FIELD

The present invention relates to filters, and more particularly, to a differential pressure gauge for filters.

BACKGROUND

Filters are commonly used in many different applications to ensure that a liquid meets a certain standard of purity or cleanliness. In one example, fluids such as gasoline and hydraulic fluid is filtered to ensure that there are no particles in the fluid that might damage an engine or a pump. In another example, gas such as an exhaust is filtered to minimize the pollution generated by an engine. The applications in which such filters are used are endless and include automobiles, tractors, farm equipment, construction equipment, and machinery.

In a typical application, fluid flows through a filter, which removes foreign matter or particles from the fluid. These filtered particles accumulate in the filter element. As these particles accumulate, the filter element becomes plugged or clogged and loses its effectiveness. As result, the amount of foreign matter in the fluid that escapes through the filter will increase to a dangerous level and may damage the equipment that uses the fluid or may allow an unacceptable level of contaminates to escape into the atmosphere.

In the past, one structure that has been used to monitor the effectiveness of the filter is a pressure differential switch. Such a switch monitors the fluid pressure on both sides of the filter element. As the filter element becomes plugged, the pressure differential across the filter increases. Accordingly, the pressure differential switch is calibrated to close when the pressure differential rises above a predetermined level. The switch can then cause some event to occur such as activating a warning alarm or a warning light. One example of such a pressure differential switch is disclosed in U.S. Pat. No. 4,480,160, which is entitled Differential Pressure Switch and issued on Oct. 30, 1984, the disclosure of which is hereby incorporated by reference.

One difficulty with these preexisting pressure differential switches is that they typically have only a single output. They are either opened or closed, and their state or output changes only when the pressure differential across the filter element crosses single predetermined threshold value. As a result, the preexisting pressure switches can provide only limited information. For example, they cannot provide both a warning signal that indicates a filter element is at the lower limits of acceptable performance and also a warning signal that indicates when the filter has failed. Thus the switch must be set to either provide an operator with a warning signal that the filter is reaching is failure point or a warning that the filter has actually failed. In the first scenario, the operator does not have any warning that the filter has failed. In the second scenario, the operator does not have warning the filter is reaching its limit of acceptable performance and thus does not have any warning to perform preventative maintenance until after the filter actually fails and exposes equipment to damage.

Another difficulty is that the output or warning signal of typical pressure differential switches for filters is mechanical. The switch merely provides a visual indicator for an operator when it is tripped. The filter does not provide electronic accumulation of information, which can be used for a variety of useful purposes. For example, such information would enable a computer to control operation of the equipment utilizing the filter and prevent damage if a filter fails. In another example, such information could be used to monitor filter maintenance for warranty purposes.

SUMMARY

The current disclosure provides techniques that can be applied to a pressure differential sensor that has a variable output. In other words, the sensor output includes one or more signals that convey information regarding a pressure differential measurement across a filter element. The output can be communicated to a variety of devices such as visual indicators or a computer.

One aspect of the present invention is an apparatus for measuring the differential pressure of fluid in filter. The apparatus comprises a housing defining a pressure chamber. A magnet is positioned within the chamber. A circuit board has a circuit mounted on it. The circuit has a hall-effect sensor responsive to the magnet and a first set of electrical components. The hall-effect sensor is mounted on one side of the circuit board and the first set of electrical components is mounted on an opposite side of the circuit board.

Another aspect of the invention is an apparatus for measuring the differential pressure of fluid in filter that comprises a housing defining a pressure chamber, and a magnet positioned within the chamber. A hall-effect sensor is responsive to the magnet, and a circular circuit board mounts the hall-effect sensor.

Yet another aspect of the invention is an apparatus for measuring the differential pressure of fluid in filter that comprises a sensor assembly including a housing and a sensor positioned within the housing. The sensor is responsive to magnetic fields. A fluid assembly includes a sleeve and a magnetic piston, the sleeve defines a fluid chamber. The magnetic piston is positioned within the fluid chamber and divides the fluid chamber into a high-pressure portion and a low-pressure portion. The fluid assembly is removably attached to the sensor assembly.

Yet another aspect of the invention is a method of measuring differential pressure in a filter head. The filter head includes a differential pressure gauge, and the differential pressure gauge includes a magnetic piston, a hall-effect sensor, and a circuit. The hall-effect sensor outputs a sensor voltage in response to the magnetic piston, and the circuit outputs an output voltage in response to the senor voltage. The method comprises moving a magnetic piston in one direction while the differential pressure is increasing and in an opposite direction when the differential pressure is decreasing; generating a sensor voltage, the amplitude of the sensor voltage corresponding to the position of the magnetic piston; generating an output voltage in response to the sensor voltage; and adjusting the output voltage to compensate for hysteresis in movement of the magnetic piston.

DESCRIPTION OF THE DRAWINGS

FIG. 11 shows the output signal of the sensor shown in FIG. 10.

FIG. 12 shows an alternative embodiment of the filter head and pressure differential gauge shown in FIG. 9.

FIGS. 16A–16C are a cross-sectional views of an alternative embodiment of a differential pressure gauge housing shown in FIGS. 13–15.

FIG. 17 is a top-plan view of a circuit board illustrated in FIG. 16A.

FIG. 18 is a cross-sectional view of a sleeve illustrated in FIGS. 16A and 16B.

FIG. 21 illustrates one circuit that can be connected to the sensors illustrated in FIGS. 6, 10, and 20.

FIGS. 23a and 23b illustrate look up tables stored on a microcontroller shown in FIG. 22.

DETAILED DESCRIPTION

Figure 1:
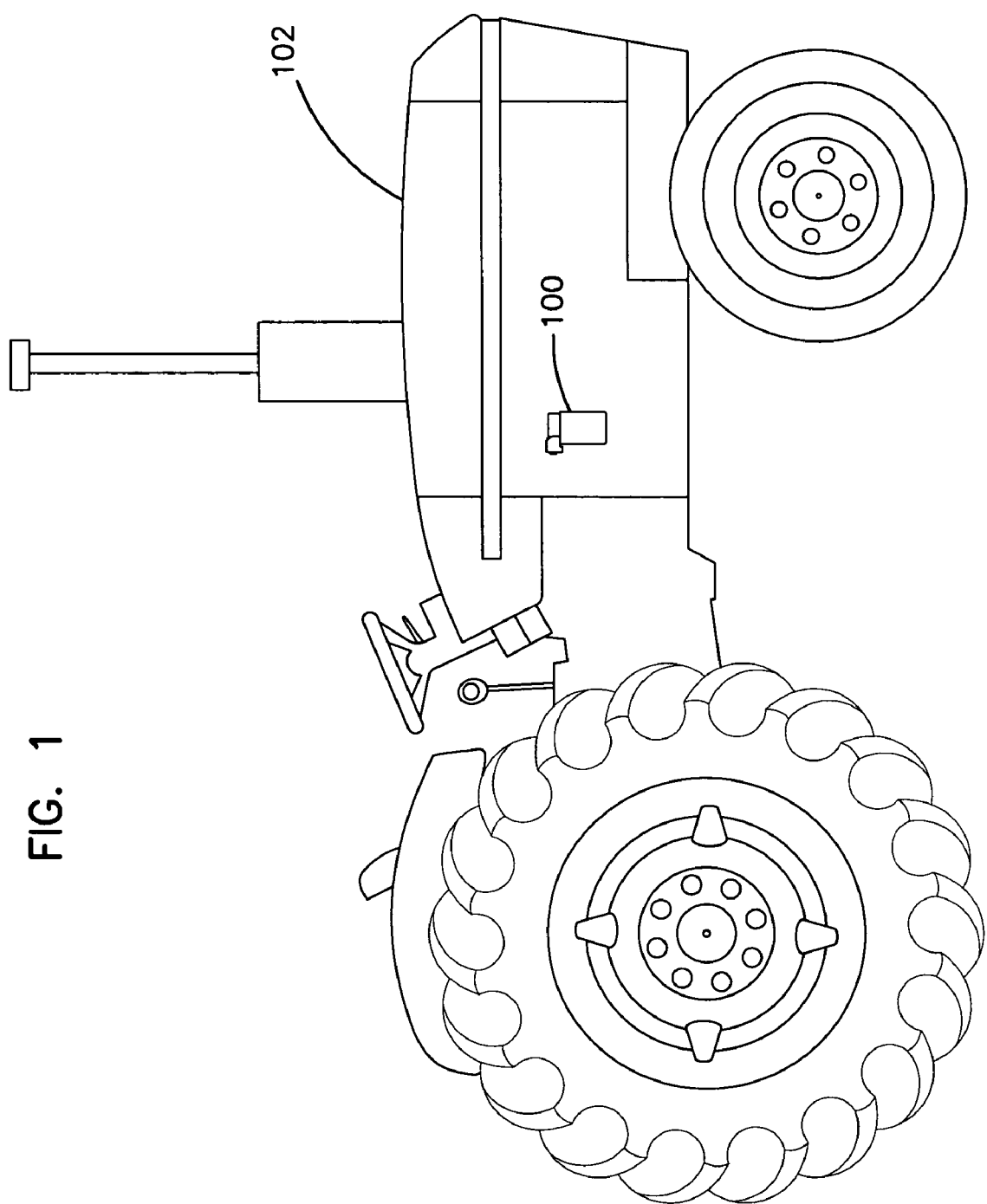
FIG. 1 illustrates an operating environment for a filter assembly embodying the present invention.

Preferred embodiments of the present invention will be described in detail with reference to the drawings, wherein like reference numerals represent like parts and assemblies throughout the several views. This description does not limit the scope of the invention, which is limited only by the scope of the attached claims.

Referring to FIG. 1, an application for the filter assemblies 100 described herein are to remove foreign mater from hydraulic fluid that is used in vehicles such as tractors 102. An example of such a tractor is an agricultural tractor that has a hydrostatic transmission and a hydraulic system, both of which require a filter. Such a hydraulic system can be used for a variety of purposes including raising and lowering farm implements such as plows. A hydraulic system can also be used to raise and lower earth moving equipment such as blades, buckets, back hoes, scrapers. An example of the type of hydraulic fluid for which the filter assembly 100 is used is Mobile D.T.E. light. Additionally, the filter assembly 100 can be used with tractors that have a variety of engine sizes and pump sizes.

There are many other applications for the filters and differential pressure gauges that are described herein. For example, such filters and differential pressure gauges can be used for other farm equipment, construction equipment, skidders, loaders, other off-road vehicles, heavy-duty highway trucks, automobiles, and other vehicles, industrial machines requiring hydraulic filtering, and all other equipment or mechanical devices that require the filtering of fluids. Additionally, the filters described herein can be used to remove foreign mater from a variety of different fluids. Examples of liquid fluids include other hydraulic fluids, engine lube oil, diesel fuel, gasoline, engine coolant, automatic transmission fluid, and any other types of fluid. The filter can also be used with gaseous fluids such as air and exhaust.

Figure 2:
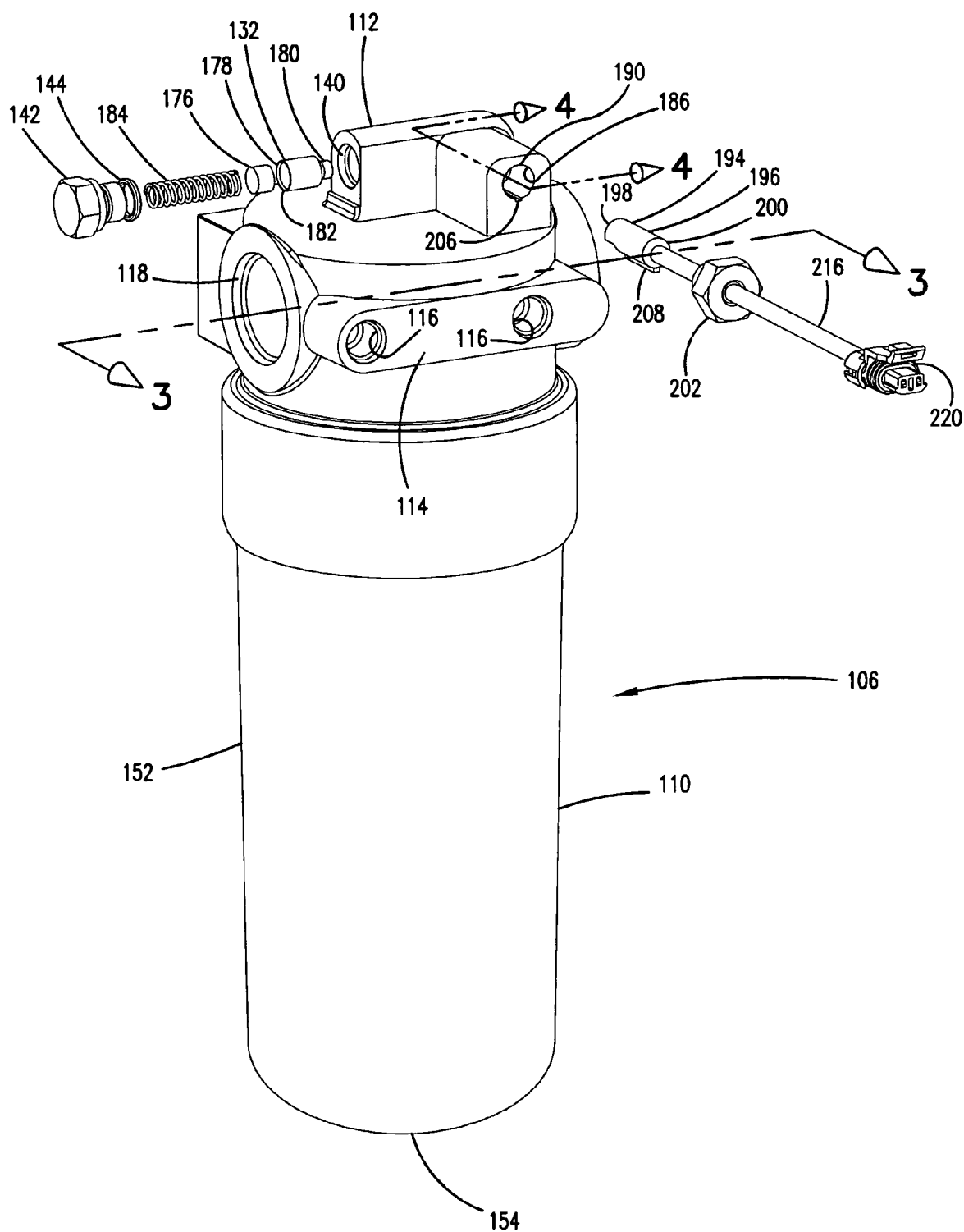
FIG. 2 is a partially exploded perspective view of a filter assembly embodying the present invention.
Figure 3:
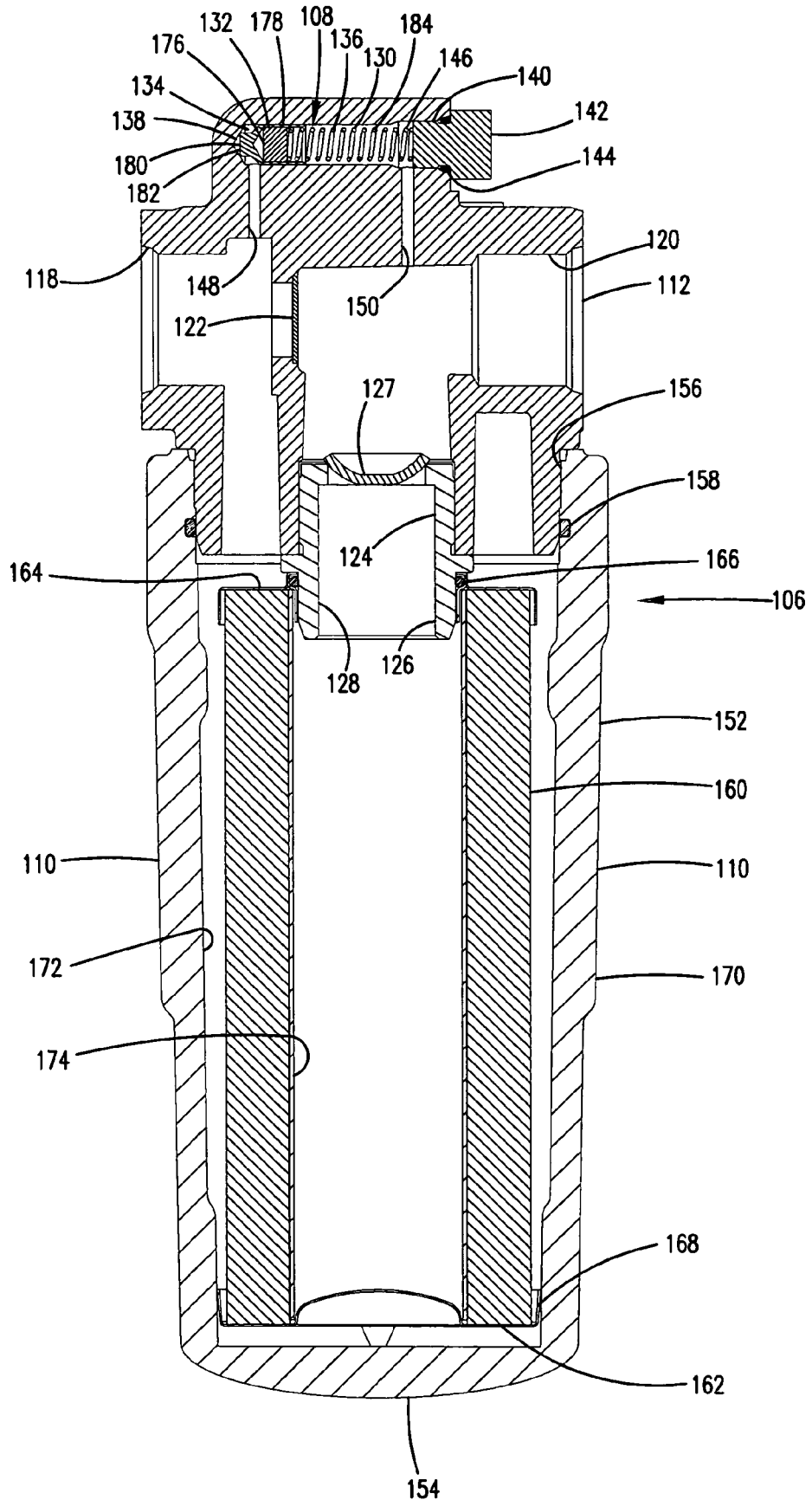
FIG. 3 is a cross-sectional view taken along line 3—3 of FIG. 2.
Figure 4:
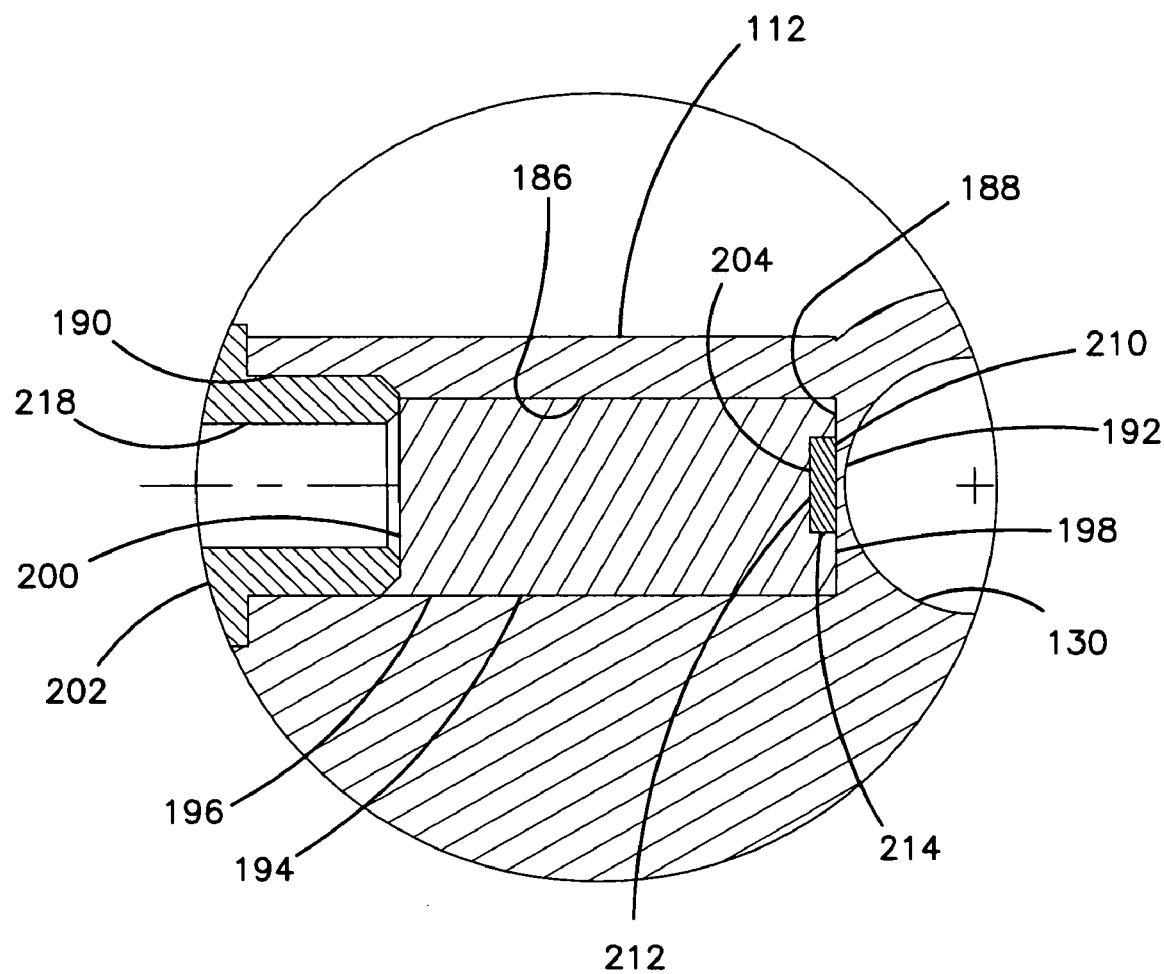
FIG. 4 is a partial cross-sectional view taken along line 4—4 of FIG. 2.

FIGS. 2–4 illustrate a filter assembly, generally shown as 106, that has a differential pressure gauge assembly 108 having a perpendicular sensor arrangement as described below. More particularly, the filter assembly 106 includes a filter 110 and a filter head 112. The filter head 112 is formed from a non-ferrous material and forms a substantially flat mounting surface 114 and two bolt holes 116. Aluminum is one example of such a material. In alternative embodiments, the filter head 112 can be formed with other material including ferrous materials.

The filter head 112 also defines an input passage 118 and an output passage 120. A pressure-relief valve 122 is positioned between the input passage 118 and the output passage 120. The pressure-relief valve 122 opens when the pressure of fluid in the input passage 118 reaches a predetermined level and provides fluid communication directly between the input and the output passages 118 and 120.

A valve housing 124 defines a passageway and is positioned within the mouth 126 of the output passage 120. A portion of the valve housing 124 extends downward from the output passage 120. A one-way, anti-drain valve 127 is positioned in a passage 128 defined in the valve housing 124 and prevents fluid from flowing backwards into the filter 110. If the filter 110 is detached from the filter head 112, the one-way valve 127 prevents fluid from passing onto the ground.

The filter head 112 also defines an upper fluid chamber 130 that functions as a pressure chamber and is generally cylindrical in shape, although other shapes and configurations for the upper fluid chamber 130 are possible. A piston 132 is positioned in the upper fluid chamber 130 and divides the chamber into a high-pressure portion 134 and a low-pressure portion 136.

The upper fluid or pressure chamber 130 is generally cylindrical and has first and second ends 138 and 140. The first end 138 is at the high-pressure portion 134, and the second end 140 is at the low-pressure portion 136. The lengths of the high-pressure portion 136 and low-pressure portions 136 will change as the piston 132 moves along the length of the pressure chamber 130. The second end 140 is open, and is sealed with a threaded plug 142 and o-ring 144.

The diameter of the pressure chamber 130 slightly increases proximal the second end 140. The portion of pressure chamber 130 with the increased diameter forms a fluid receiving area 146. A first passage 148 provides fluid communication between the input passage 118 and the high-pressure portion 134 of the pressure chamber 130. A second passage 150 provides fluid communication between the output passage 120 and the low-pressure portion 136 of the pressure chamber 130. In one embodiment, the outlet of the first passage 148 is as close as possible to the first end 138 of the pressure chamber 130. Similarly, the outlet of the second passage 150 is as close to the plug 142 as possible and opened into the fluid receiving area 146 of the pressure chamber 130. This configuration maximizes the piston's 132 range of motion.

The filter head 112 described herein is only one possible embodiment that can incorporate a differential pressure gauge. The filter head 112 can include any other structure that provides fluid flow through a filter element.

The filter 110 includes a filter housing 152 that has a closed end 154 and an open end 156. The open end 156 is attached to the filter head 112. An o-ring 158 creates a seal between the filter housing 152 and the filter head 112. A filter element 160 is positioned within the filter housing 152. In one embodiment, the filter housing 152 can include a drain plug (not shown) for draining fluid from the filter housing 152 before it is detached from the filter head 112.

In one embodiment, the filter element 160 is tubular in shape and has a lower edge 162 proximal to the closed end of the filter housing 152 and an upper end 164 that is proximal to the filter head 112. Other filter and filter elements can be used in conjunction with a pressure differential gauge. For example, the pressure differential gauge described herein can be used with filter elements that have a shapes and geometry other than tubular shapes.

The upper end 164 of the tubular filter element 160 circumscribes the valve housing 124. An o-ring 166 creates a seal between the upper end 164 of the filter element 160 and the valve housing 124. Additionally, a gasket 168 creates a seal between the lower edge 162 of the filter element 160 and the wall 170 of the filter housing 152. In this configuration, the filter element 160 divides the filter 110 into outer and inner chambers 172 and 174, and fluid flows through the input passage 118, into the outer chamber 172, through the filter element 160, into the inner chamber 174, through the one-way valve 127, and through the output passage 120.

The tubular filter element 160 can have a variety of sizes and dimensions. For example, one possible range of diameters for the filter element 160 is from about 2 inches to about 40 inches. A possible range of heights for the filter element 160 is from about 2 inches to about 40 inches. A possible range of fluid flow capacity for the filter element 160 is from about 0 gallons per minute to about 250 gallons per minute. However, the precise dimensions and fluid flow capacity for a filter element 160 will vary greatly from application to application. In a typical example such as the agricultural tractor discussed above, for example, the filter element 160 is about 4.75 inches in diameter, is about 11 inches tall, and has a fluid flow rate from about 0 to about 45 gallons per minute.

The piston 132 is formed from a magnet 176 positioned within a sleeve 178 and is sized to slide along the length of the pressure chamber 130, but still maintain a seal between the high-pressure portion 134 and the low-pressure portion 136. In one embodiment, the magnet 176 is cylindrical and has a centerline that is co-linear with the centerline of the upper fluid or pressure chamber 130. In this embodiment, the magnetic field generated by the magnet 176 is symmetrical around the centerlines of both the magnet 176 and the pressure chamber 130. However, other embodiments do not have a cylindrical magnet or a magnet having a centerline that is co-linear with the pressure chamber 130.

One embodiment of the piston sleeve 178 is generally cylindrical in shape and conforms to the shape of the pressure chamber 130. A protrusion 180 extends from the end 182 of the sleeve 178 and into the high-pressure portion 134 of the pressure chamber 130. The diameter of the protrusion 180 is smaller than the diameter of the sleeve 178. This configuration prevents the sleeve 178 from extending all the way to the first end of the pressure chamber 130 and sealing the outlet portion of the first passage 148. In other words, the protrusion 180 holds open the high-pressure portion 134 of the pressure chamber 130 so that fluid can flow in from the first passage 148.

One embodiment of the sleeve 178 is formed with a resin material such as nylon. One type of nylon material that can be used is "HYTREL" brand polyester elastomers, which is commercially available from E. I. DuPont de Nemours and Company of Wilmington, Del. Other embodiments can include any other material that will stand up to fluids and allow the piston 132 to slide against the aluminum that forms the surface of the pressure chamber 130.

A spring 184 extends between the piston 132 and the plug 142. The spring 184 biases the piston 132 toward the first end 138 of the pressure chamber 130. The end of the spring 184 that engages the piston 132 extends into the sleeve 178 and rests against the magnet 176. The spring constant and the extension of the spring 184 while in a relaxed state will vary depending on the desired sensitivity and range of the differential pressure gauge.

In one embodiment, the piston 132 has a range of motion between about ½ inch to about 2 inches within the pressure chamber 130. In another embodiment, the range of motion for the piston 132 is between about ¾ inch and about 1¼ inches. Yet another embodiment of the piston 132 has a range of motion of about 1 inch.

In this configuration fluid, from the input passage 118 fills the high-pressure portion 134 of the pressure chamber 130 and the outer chamber 172 of the filter 110. Similarly, fluid in the outer chamber 172 of the filter 110 flows through the filter element 160 and into the inner chamber 174 of the filter 110. From the inner chamber 174, the fluid flows into the low-pressure portion 136 of the pressure chamber 130 and through the output passage 120.

As the filter element 160 becomes clogged, the fluid does not flow through it as easily and fluid pressure within the outer chamber 172 of the filter 110 increases. This increased pressure also causes the fluid pressure within the high-pressure portion 134 of the pressure chamber 130 to increase relative to the fluid pressure in the low-pressure chamber 136 of the pressure chamber 130. The increased fluid pressure drives the piston 132 against the spring 184 and causes it to move toward the second end 140 of the pressure chamber 130.

Referring to FIGS. 2 and 4, a sensor chamber 186 is also formed in the filter head 112 and is perpendicular to the pressure chamber 130. The sensor chamber 186 has a first end 188 proximal to, but not in fluid communication with, the pressure chamber 130. The sensor chamber 186 also has a second end 190 that is open.

There is a thin, intermediate wall 192 formed from non-ferrous aluminum between the sensor chamber 180 and the pressure chamber 130. One embodiment of the intermediate wall 192 has a thickness between about 1/16 inch and about 3/16 inch. Other embodiments have a thickness of about 1/8 of an inch.

A sensor assembly 194, together with the piston 132, spring 184, and pressure chamber 130 form a differential pressure gauge. The differential pressure gauge can detect a broad range of differential pressures. One embodiment is sensitive to a pressure range of about 2 differential pounds per square inch (psid) to about 100 psid. Another embodiment is sensitive to a pressure range of about 7 psid to about 80 psid.

The sensor assembly 194 includes a sensor plug 196 and is positioned snugly within the sensor chamber 186 so that it has minimal movement. The sensor plug 196 has first and second ends 198 and 200. The sensor plug 196 is secured within the sensor chamber 130 with a nut 202 that is threaded to the filter head 112.

A hall-effect sensor 204 is mounted to the end of the plug 196 and is positioned at the first end 188 of the sensor chamber 186. The plug 196 and surface of the sensor chamber 186 have a slot 206 and key 208 arrangement that properly orients that the hall-effect sensor 204. In another embodiment, the hall-effect sensor 204 is potted within the sensor chamber 186. That is, the hall-effect sensor is positioned against the intermediate wall 192 and the sensor chamber is then filled with a liquid that hardens and seals the hall-effect sensor 204 in place. The potting can be formed from a variety of materials. Examples include epoxies and urethanes that are not conductive to electricity. In this configuration, the sensor 204 is isolated from the pressure chamber 130 and hence isolated from the fluid.

The hall-effect sensor 204 has a front surface 210 that is active or sensitive to magnetic fields and a rear surface 212. The rear surface 212 opposes the plug 196 and the active, front surface 210 faces away from the plug 196. In this configuration, the active surface 210 is positioned facing, and in close proximity to the intermediate wall 192 that is between the pressure chamber 130 and the sensor chamber 186. In one embodiment, the active surface 210 of the sensor 204 lies against the intermediate wall 192. The sensor 204 also has a lower surface 214, which faces downward toward the filter 110.

Figure 7:
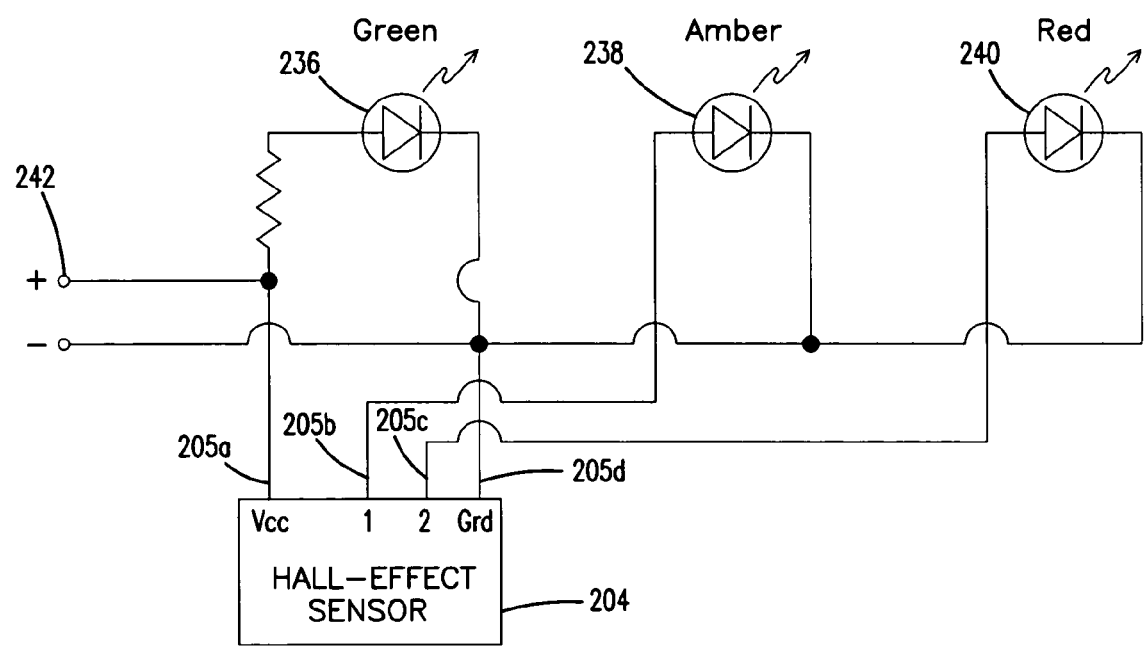
FIG. 7 illustrates one circuit having warning lights that can be used with the present invention.

One hall-effect sensor 204 that can be used is model no. UGN3235K, which is commercially available from Allegro MicroSystems, Inc. of Worcester, Mass. Referring to FIG. 7, this hall-effect sensor 204 has four pins 205a–205d, one for a voltage supply 205a, one ground 205d, and two outputs 205b and 205c. Referring back to FIGS. 2 and 4, a four-wire cable 216 is connected to the four pins, extends through the plug 196, through a hole 218 defined in the nut 202, and terminates in an electrical connector 220. The connector 220 can be used to electrically connect the hall-effect sensor 204 to a variety of different analog or digital circuits such as warning lights or a variety of different programmable circuits such as a computer, a microprocessor, a microcontroller, or a programmable logic array.

The first output of the hall-effect sensor 204 is in a normally low state and switches to a high state in response to detecting a threshold level of positive flux from the south pole of the piston magnet 176. The second output also is in a normally low state and switches to a high state in response to detecting a threshold level of positive flux from the south pole of the magnet 176.

Figure 5:
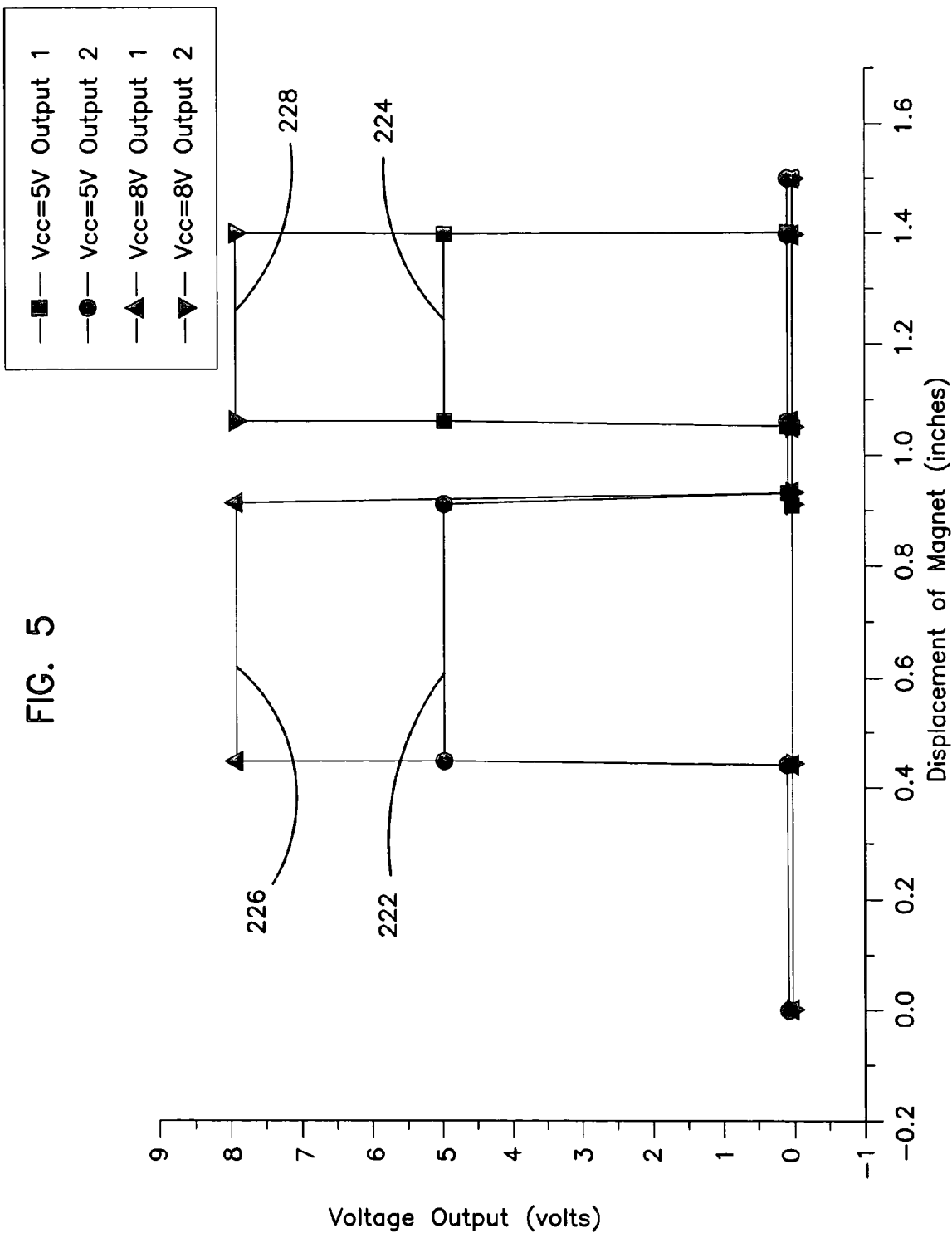
FIG. 5 illustrates the output of one type of sensor that can be used with the present invention.

A graph of the output for the UGN3235K hall-effect sensor is illustrated in FIG. 5, when used in the embodiment described above. The graph illustrates the sensor output verses the displacement of the magnet in the piston. The displacement of the magnet 176 is 0.0 when the piston 132 is positioned against the first end 138 of the pressure chamber 130. The first and second traces 222 and 224 illustrate the signal transmitted through the first and second outputs, respectively, when the voltage supply to the hall-effect sensor is 5 Volts. The third and fourth traces 226 and 228 illustrate the signal transmitted through the first and second outputs, respectively, when the voltage supply to the hall-effect sensor is 8 Volts.

Figure 6:
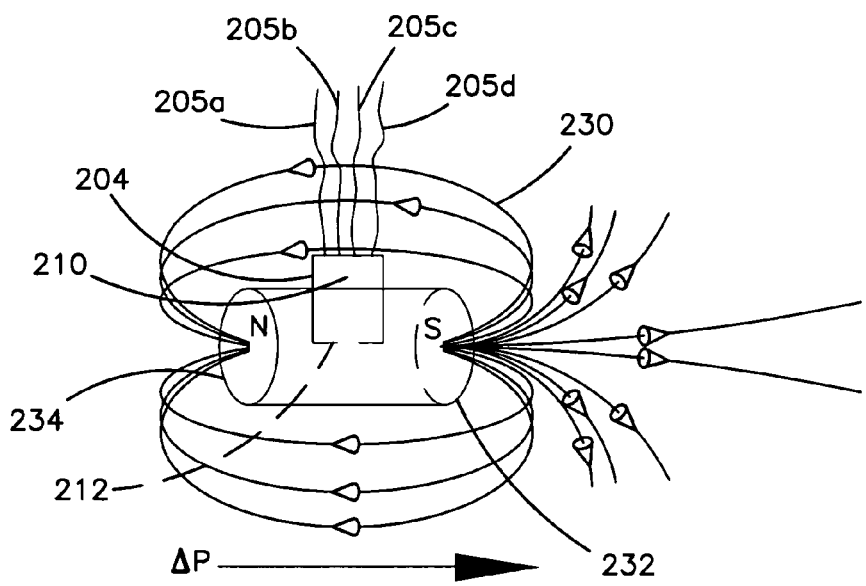
FIG. 6 illustrates one magnet and sensor arrangement that can be used with the present invention.

Referring to FIGS. 5 and 6, the movement of the piston 132, and hence the magnet 176, is perpendicular to the hall-effect sensor 204. The flux lines 230 from the magnet field generated by the magnet 176 flow from the south pole 232 of the magnet 176 to the north pole 234. As the south pole 232 of the magnet 176 approaches the hall-effect sensor 204, the magnetic flux 230 from the south pole 232, which is a positive flux, will flow through it in one direction. When the strength of the field to which the sensor 204 is exposed reaches a threshold level, the positive magnetic flux 230 causes the first output of the hall-effect sensor 204 to change from a low state to a high state.

As the midpoint of the magnet 176 approached the hall-effect sensor 204, the magnetic flux 230 begin to run parallel to, or near parallel to the active face 210 hall-effect sensor 204. As a result, the magnetic flux 230 does not pass through the hall-effect sensor 204, and the positive flux 230 to which the hall-effect sensor 204 is exposed falls below the threshold level. The first output then returns to a low state. As the north pole 234 of the magnet 176 approaches the hall-effect sensor 204, the magnetic flux 230 from the north pole 234, which is a negative flux, will flow through it in an opposite direction. When the strength of the field to which the sensor 204 is exposed reaches a threshold level, the negative magnetic flux causes the second output of the hall-effect sensor 204 to change from a low state to a high state.

Magnets of various strengths can be used. In one embodiment, the strength of the magnet has a range between about 200 gauss and about 800 gauss. In other embodiment, the magnet has a strength between about 400 gauss and about 800 gauss. One type of magnet that can be used is an ALNICO8 magnet such as model number S8A632, which is commercially available from Arnold Magnet of Marango, Ill. One of many dimensions that can be used for the magnet 176 has a diameter of about 3/8 inch and a length of about 3/8 inch.

In one embodiment, as shown in FIG. 7, the outputs of the hall-effect sensor 204 drives a circuit that illuminates various LED's. The circuit includes the dual output hall-effect sensor 204, a green LED 236, an amber LED 238, and a red LED 240. A power supply 242 provides 5 Volts D.C. As one skilled in the art will recognize, the power is supplied through a voltage regulator (not shown). An alternative embodiment can provide other power levels, such as 8 volts as discussed above. The power supply 242 also provides power to the hall-effect sensor 204, through the Vcc and ground terminals 205a and 205d.

The cathodes of the three LED's 236, 238, and 240 are in direct electrical communication with ground. The anode of the green LED 236 is in electrical communication with positive terminal of the power supply 242. Thus the green LED 236 indicates that power is being supplied to the circuit, including the hall-effect sensor 204. The anode of the amber LED 238 is in electrical communication with the first output 205b of the hall-effect sensor 204. Similarly, the anode of the red LED 240 is in electrical communication with the second output 205c of the hall-effect sensor 204. Depending on the voltage and current output by the power supply 242 and the hall-effect sensor outputs 205b and 205c, other embodiments might include resistors connected in series with the LED anodes.

In operation, the first and second outputs 205b and 205c of the hall-effect sensor 204 are normally low, which prevents the amber and red LED's 238 and 240 from illuminating. As pressure within the high-pressure portion 134 of the pressure chamber 130 increases and drives the piston 132 toward the hall-effect sensor 204. As south pole 232 of the magnet 176 approaches the hall-effect sensor 204, the flux will cause the hall-effect sensor 204 to jump to a high state. This action increases the voltage potential across the amber LED 238 and causes it to illuminate signaling that the filter element 160 is approaching its operating limits.

As the filter element 160 continues to clog, the pressure in the high-pressure portion 134 of the pressure chamber 130 continues to increase and drive the north pole 234 of the magnet 176 toward the hall-effect sensor 204. As the midpoint of the magnet 176 approaches the midpoint of the hall-effect sensor 204, the magnetic flux 230 runs parallel to the sensor 204. As a result, the sensor 204 is not subject to either a substantial positive and negative flux and both outputs 205b and 205c of the sensor 204 return to a low state. Neither the amber nor the red LED's 238 or 240 are illuminated at this point.

As the fluid pressure in the high-pressure portion 134 of the pressure chamber 130 continues to increase, the north pole 234 of the magnet 176 approaches the hall-effect sensor 204 and exposes the hall-effect sensor 204 to the flux. This flux causes the second output 205c of the hall-effect sensor 204 to jump to a high state and illuminate the red LED 240, which indicates that the filter element 160 has clogged or failed and is no longer adequately filtering the fluid.

Travel of the magnet 176 is limited by the second end 140 of the pressure chamber 130 so that the north pole 234 of the magnet 176 will not travel past the hall-effect sensor 204 and the red LED 240 will not stop emitting light as pressure within the high-pressure portion 134 of the pressure chamber 130 continues to build.

In an alternative embodiment, the first and second outputs 205b and 205c from the hall-effect sensor 204 are input to a programmable circuit such as a computer that is onboard a tractor, vehicle, or other machinery. In this scenario, the onboard computer detects the state changes from the first and second outputs 205b and 205c of the hall-effect sensor 204 and are programmed to perform certain tasks in response thereto. For example, the onboard computer might be programmed to control the illumination of warning lights, similar to those described above. The onboard computer might keep a log of how long an engine or other machinery has run with a filter that has failed. In yet another embodiment, the onboard computer might even be programmed to send a signal to an engine control module that causes the engine to shut down when the second output 205c of the hall-effect sensor 204 changes states because the filter element 160 failed. The programmable circuit might also communicate with other computers that are onboard a vehicle or control a machine.

Figure 8:
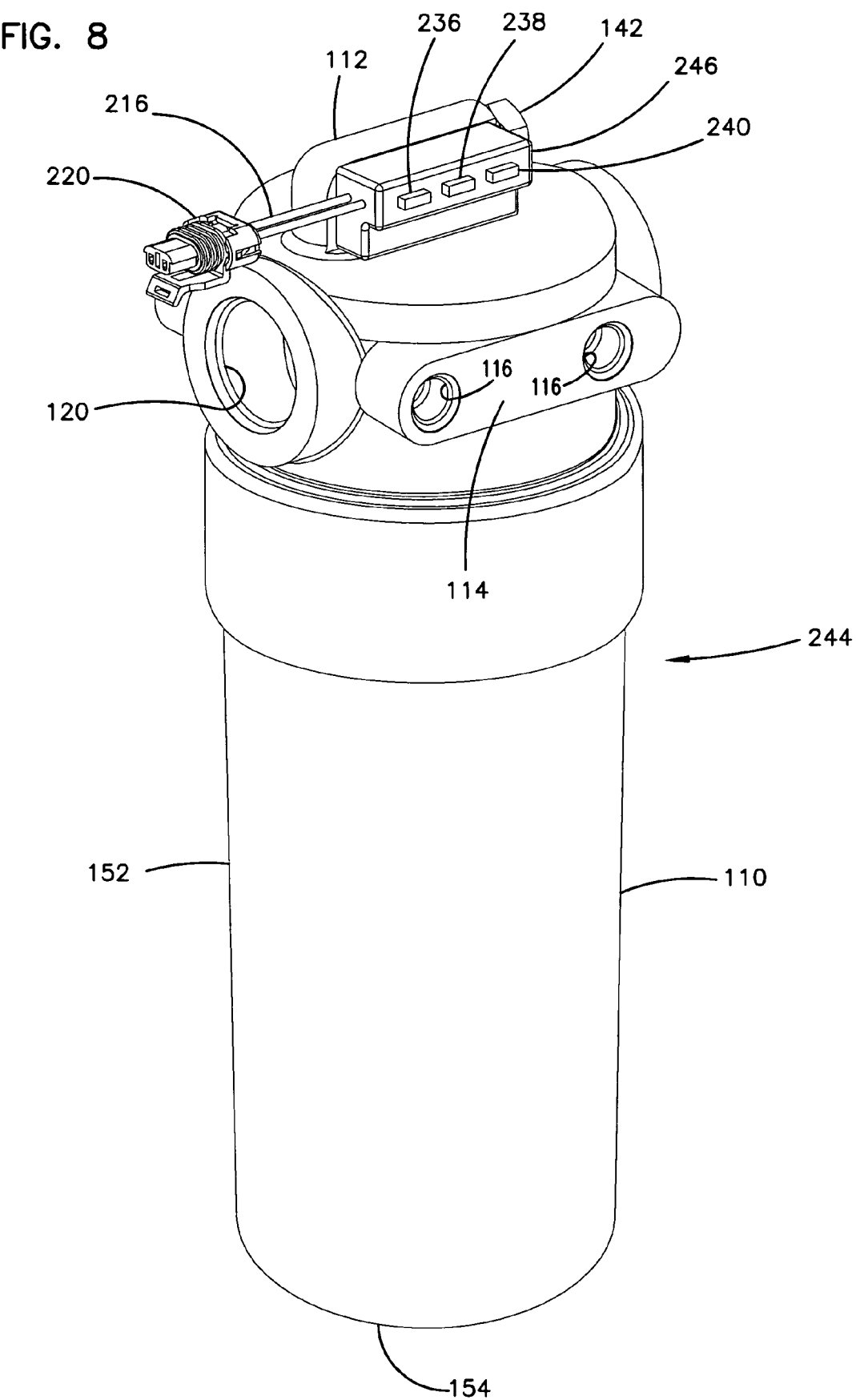
FIG. 8 illustrates an alternative embodiment of the filter assembly shown in FIG. 2.

FIG. 8 illustrates another alternative embodiment of a filter assembly, generally shown as 244. The filter assembly 244 is similar to the filter assembly 106 described above and includes a filter 110 and a filter head 112 that defines an input passage 118, an output passage 120, an upper fluid chamber 130 that functions as a pressure chamber, and first and second passages 148 and 150. The filter head 112 also has a pressure-relief valve 122, a one-way valve 127, an intermediate wall 192, a piston 132, a spring 184, and a plug 196 and sensor arrangement 204. The filter 110 includes a filter housing 152 and a filter element 160 that divides the filter housing 152 into inner and outer chambers 174 and 172.

Additionally, a housing 246 that contains electronics is mounted on the filter head 112 and replaces the sensor chamber. The hall-effect sensor 204 is mounted in the housing 246, and the active face 210 of the sensor 204 is positioned proximal to or against the intermediate wall 192. The LED's 236, 238, and 240, are mounted on the housing 246 so that they are visible to an operator. The filter assembly 244 also includes a four-wire cable 216 so that the hall-effect sensor 204, in addition to the LED's, is in electrical communication with remote electronics or a computer.

Figure 9:
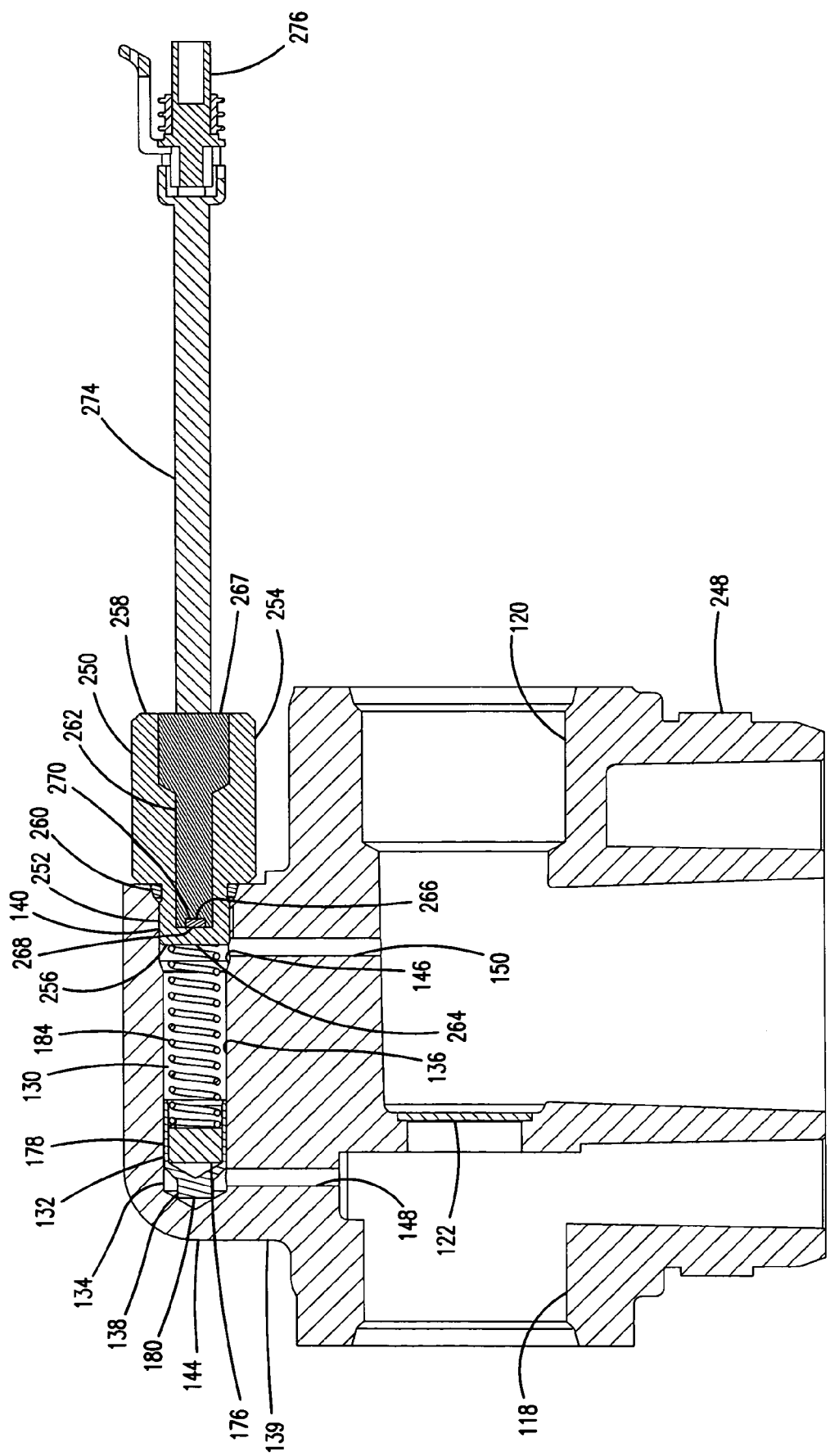
FIG. 9 is a cross-sectional view of an alternative embodiment of the filter head and pressure differential gauge shown in assembly shown in FIG. 2.

FIG. 9 illustrates an alternative embodiment of a filter head 248 that has a differential pressure gauge with a linear sensor arrangement. The filter head 248 is similar to the filter head 112 described above in that it defines an input passage 118, an output passage 120, an upper fluid chamber 130 that functions as a pressure chamber, a fluid receiving portion 146 formed in the pressure chamber 130, and first and second passages 148 and 150. The filter head 248 also has a pressure-relief valve 122, a one-way valve 127, and an intermediate wall 192. A piston 132 has a sleeve 178, a magnet 176, and a protrusion 180, and a spring 184 that biases the piston 132 toward the first end 138 of the pressure chamber 130.

Additionally, a sensor housing 250 has first and second portions 252 and 254 and first and second ends 256 and 258, respectively. The first end 256 is closed and the second end 258 is open. The first portion 252 has a smaller diameter than the second portion 254 and is threaded within the opening at the first end 256 of the pressure chamber 130. An o-ring 260 creates a seal between the pressure chamber 130 wall and the sensor housing 250. The sensor housing 250 is formed from a non-ferrous material such as aluminum.

The cylindrical sensor housing 250 defines a sensor chamber 262, and the first end 256 of the housing 250 forms an intermediate wall 264 between the pressure chamber 130 and the sensor chamber 262. One embodiment of the intermediate wall 264 has a thickness between about 1/16 inch and about 3/16 inch. Other embodiment have a thickness of about 1/8 of an inch.

A hall-effect sensor 266 has first and second faces 268 and 270. The first face 268 is active and is responsive to magnetic flux. The hall-effect sensor 266 is positioned in the sensor chamber 262 so that the first face 268 is against the intermediate wall 264. Additionally, the center of the first, active face 268 is aligned with the centerlines of the magnet 176 and the pressure chamber 130. The hall-effect sensor 266 is potted 267 within the sensor chamber 262 with an electrically non-conductive material such as an epoxy or a urethane.

Figure 10:
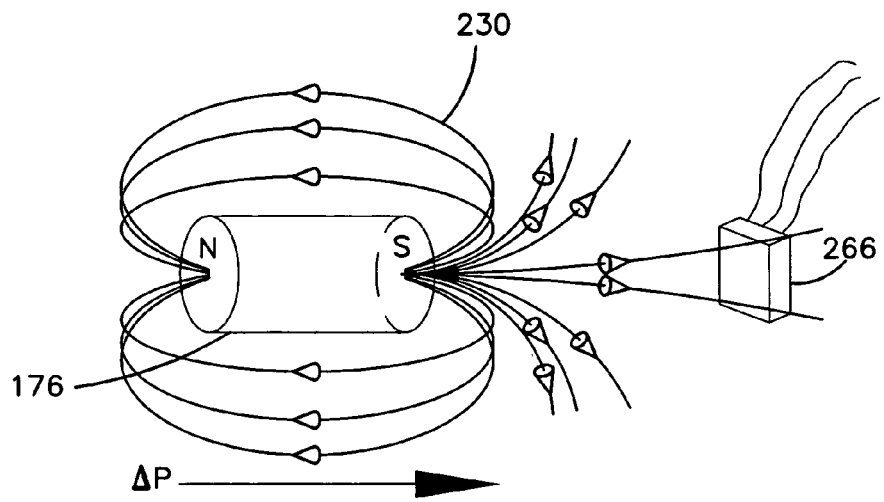
FIG. 10 shows the relationship between a magnet and sensor included within the filter assembly embodiment shown in FIG. 9.

Given this arrangement, the hall-effect sensor 266 is linearly aligned with path of the piston 132 and hence the magnet 176. Furthermore, the magnet 176 is oriented in the sleeve 178 so that the south pole 232 of the magnet 176 faces the active surface 268 of the hall-effect sensor 266. The movement of the piston magnet 176 relative to the hall-effect sensor 266 is illustrated in FIG. 10. As the pressure within the high-pressure portion 134 of the pressure chamber 130 increases, the piston 132, and hence the magnet 176, will move toward the hall-effect sensor 266. The voltage output from the hall-effect sensor 266 increases as the magnet 132 moves toward the sensor 266 and the magnitude of the flux 230 to which the sensor 266 is exposed increases.

One hall-effect sensor 266 that can be used is model no. A3515LUA, which is also manufactured by Allegro MicroSystems, Inc. This hall-effect sensor 266 has three pins 272a–272c, one for a voltage supply 272a, one ground 272b, and one output 272c. A cable 274 is in electrical connection to the three pins 272a–272c, extends through the potting 267, and terminates in an electrical connector 276. The voltage output from the hall-effect sensor 266 is continuous and proportional to the strength of the magnetic flux to which it is exposed. The connector 276 can be used to electrically connect the hall-effect sensor 266 to a circuit such as warning lights or to a programmable circuit.

A graph of the output for the A3515LUA hall-effect sensor, when used in the embodiment described above is illustrated in FIG. 11. The graph illustrates the sensor output verses the distance of the magnet from the hall-effect sensor 266. The first trace 278 illustrates the voltage generated by the output when the voltage supply is 8 volts. The second trace 280 illustrates the voltage generated by the output when the voltage supply is 5 volts.

The hall-effect sensor 266 also can be programmable. An example of such a programmable hall-effect sensor is the HAL800 Programmable Linear Hall-Effect sensor, which is commercially available from Micronas Intermetall GmbH of Freiburg, Germany. Several aspects of the output voltage range of the HAL800 hall-effect sensor can be adjusted. For example, the low and high voltage output levels can be adjusted. Using a programmable hall-effect sensor in this manner simplifies calibration of the differential pressure gauge during the manufacturing process. The pressure chamber 130 can be loaded with a predetermined pressure differential and the hall-effect sensor 266 then can be programmed to output the correct, predetermined high and low output voltage.

In an alternative embodiment, the hall-effect sensor 266 is mounted on the end of a plug similar to the plug 196 described above. In this embodiment, the plug and sensor 266 would be secured within the sensor chamber 262 with a nut, through which the cable 274 would extend. In yet another embodiment, the hall-effect sensor 266 and electrical connector 276 are insert molded. In other words, the hall-effect sensor 266 and connector 276 are molded into a single and unitary plastic housing that takes the place of sensor housing 250. This insert-molded unit then can be threaded into the second end 140 of the pressure chamber 130. The insert molding also can include electrical circuitry. Alternatively, the insert-molded unit can be plugged or snapped into the second end 140 of the pressure chamber 130.

Many other embodiments of the filter head 248 are possible as well. In one such embodiment, for example, second end 140 of the pressure chamber 130 is sealed with a threaded plug similar to plug 142 or other sealing structure. A sensor cavity (not shown) is then defined in the outer surface of the filter head 248 at a location 141 adjacent to and opposing the first end 138 of the pressure chamber 130. In this embodiment, the sensor cavity is formed in the outer wall 139 of the filter head 248 but does not extend all the way through the filter head 248 and does not open to the pressure chamber 130. In another possible embodiment, a bracket (not shown) is fastened to the filter head 248 at the location 141. The sensor housing 250 is then fastened into the sensor chamber or to the bracket. The sensor housing 250 can be fastened to the sensor cavity or the bracket by threads or similar mechanism such as a snap-lock fitting. This embodiment may permit existing filter head designs to be manufactured with hall-effect sensors using minimal changes to tooling designs and may also permit existing filter heads to be retrofitted with hall-effect sensors 266.

FIG. 12 illustrates an alternative embodiment of a filter head 282 and differential pressure gauge housing, generally shown as 284. The filter head 282 is similar to the filter head 248 described above and defines an input passage 118, an output passage 120, an upper fluid chamber 130, a fluid receiving portion 146 formed in the upper fluid chamber 130, and first and second passages 148 and 150. The filter head 282 also has a pressure-relief valve 122.

Figure 13:
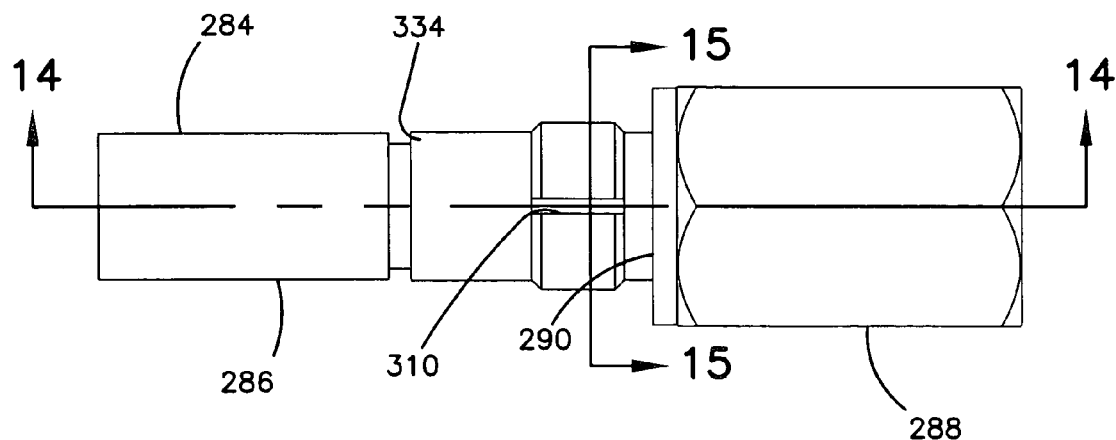
FIG. 13 shows a top elevational view of the differential pressure gauge housing illustrated in FIG. 12.
Figure 14:
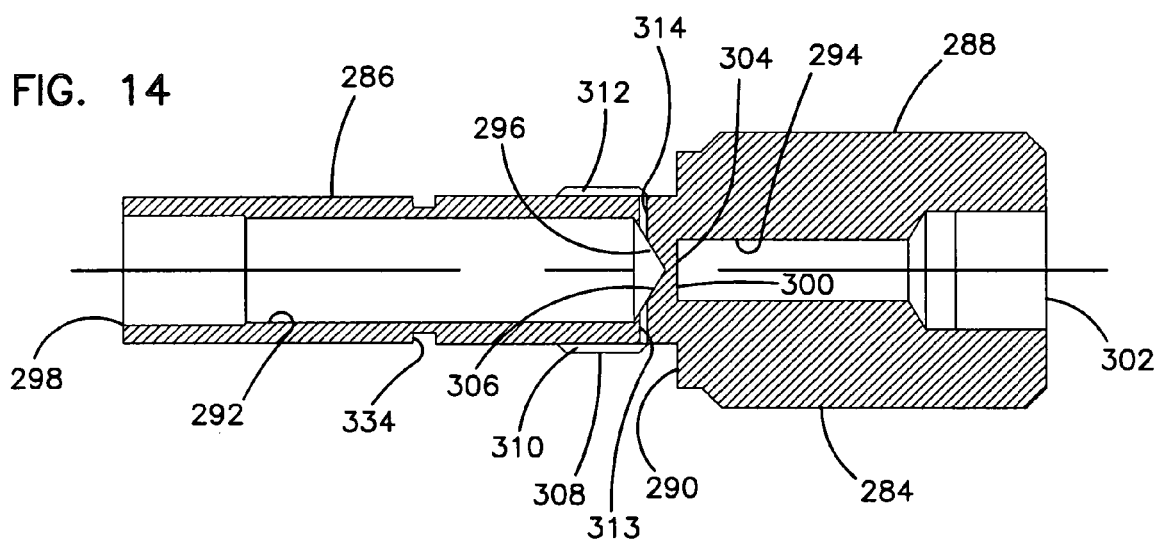
FIG. 14 is a cross-sectional view of the pressure differential gauge housing shown in FIG. 13, taken along line 14—14.
Figure 15:
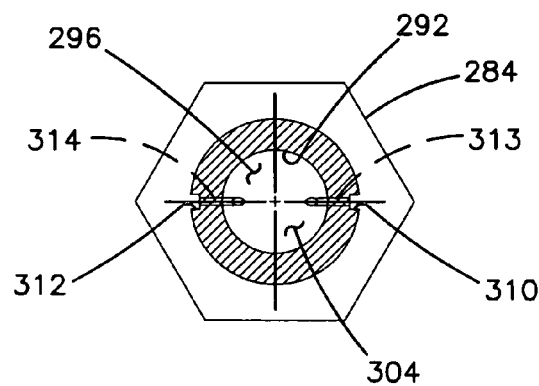
FIG. 15 is a cross-sectional view of the differential pressure gauge housing shown in FIG. 13, taken along line 15—15.

Referring to FIGS. 13–15, the differential pressure gauge housing 284 has first and second portions 286 and 288. The first portion 286 has an outer diameter sized to slide into the upper fluid chamber 130 of the filter head 282. The outer diameter of the second portion 288 is greater than the outer diameter of the first portion 286. A radial shoulder 290 extends between the first and second portions 286 and 288 of the differential pressure gauge housing 284. In one embodiment, the outer diameter of the first portion 286 of the differential pressure gauge housing 284 ranges from about 0.4 inch to about 0.9 inch. Another embodiment has a diameter of about 0.6 inch. In another embodiment the length of the first portion 286 is between about 0.9 inch and about 3.5 inches. Another embodiment has a length of about 2.3 inches.

A pressure chamber 292 is defined in the first portion 286 of the housing 284, and a sensor chamber 294 is defined in the second portion 288 of the housing 284. The pressure and sensor chambers 292 and 294 are generally cylindrical in shape and are axially aligned. The pressure chamber 292 has inner and outer ends 296 and 298. The sensor chamber 294 also has inner and outer ends 300 and 302.

An intermediate wall 304 is formed between the inner ends 296 and 300 of the pressure and sensor chambers 292 and 294, respectively. The surface 306 of the intermediate wall 304 that forms the inner end 296 of the pressure chamber 292 is generally concave in shape. In one embodiment, the thickness of the intermediate wall 304 is between about 1/16 inch and about 3/16 inch. In another embodiment the thickness is about 1/8 inch.

Threads 308 are formed in a portion 308 of the outer surface of the first portion 286 and extend from the radial shoulder 290. The threads mate with threads formed on the inner surface of the upper fluid chamber 130 of the filter head 282. The length of the threaded portion 308 is shorter than the length of the fluid receiving portion 146 of the upper fluid chamber 130 in the housing 282. Additionally, a first linear groove 310 is formed in the outer surface of the housing 284 and extends along the length of the threaded portion 308. The first groove 310 is deeper than the minor diameter of the threads. A second groove 312 is similarly formed on the opposite side of the housing 284 from the first groove 310.

In one embodiment, a first hole 313 extends between the first groove 310 and the concave surface 306 of the intermediate wall 304. A second hole 314 similarly extends between the second groove 312 and the concave surface 306 of the intermediate wall 304. The first and second holes 312 and 314 are as close to the inner end 296 of the pressure chamber 292 as possible.

Returning to FIG. 12, when the differential pressure gauge housing 284 is attached to the filter head 282, the second passage 150 is in fluid communication with the first and second grooves 310 and 312. In this configuration, fluid flows from the second passage 150, into the fluid receiving portion 146 of the upper fluid chamber 130, into the first and second grooves 310 and 312, through the first and second holes 313 and 314, and into a low-pressure portion 316 of the pressure chamber 292. In one embodiment, the outlet port of the second passage 150 is as close as possible to the first and second holes 313 and 314. In yet another embodiment, the outlet port of the second passage 150 is in direct fluid communication with the holes 313 and 314.

A piston 318 is formed from a sleeve 320 and a magnet 176 positioned within the sleeve 320. The piston 318 is positioned in the pressure chamber 292 and divides the pressure chamber 292 into a high-pressure portion 322 and the low-pressure portion 316. A spring 184 extends between the piston 318 and the intermediate wall 304 and biases the piston 318 toward the outer end 298 of the pressure chamber 292. In one embodiment, the magnet 176 is generally cylindrical and has a centerline that is co-linear with the centerline of the pressure chamber 292.

A plug 324 is threaded into the outer end 298 of the pressure chamber 292 of the housing 284. The plug 324 defines a fluid passage 326. Additionally, the sleeve 320 has a closed end 327 that defines a concave surface. The concave surface opposes the fluid passage 326 in the plug 324 and provides a space to receive fluid.

The length of the first portion 286 of the pressure differential gauge housing 284 is sized so that when it is fully inserted in the upper fluid chamber 130 of the filter head 282, there is a gap 328 between the plug 324 and the first end 138 of the upper fluid chamber 130. The first passage 148 is in fluid communication with the gap 328. In this configuration, fluid can flow from the first passage 148, through the fluid passage 326 in the plug 324, and into the high-pressure portion 322 of the pressure chamber 292.

The housing 284 is threaded to the surface of the upper fluid chamber 130 proximal to the second end 140 of the upper fluid chamber 130. A first o-ring 330 is adjacent the radial shoulder 290 and is positioned between the outer surface of the first portion 286 of the housing 284 and the inner surface of the upper fluid chamber 130. An second o-ring 332 rests in a groove 334 that is formed around the circumference of the first portion 286 of the housing 284 and is positioned so that it is between the first and second passages 148 and 150 when the housing 284 is inserted into and engaging the upper fluid chamber 130 of the filter head 282.

The sensor chamber 294 is similar to the sensor chamber 262 discussed above. A continuous output hall-effect sensor 266 is positioned within the sensor chamber 294 with the first, active face 268 opposing the intermediate wall 304. Additionally, the center of the first face 268 is aligned with the centerline of the magnet 176 and the pressure chamber 292. The hall-effect sensor 266 is potted 267 with an electrically non-conductive material such as an epoxy or urethane. This configuration isolates the hall-effect sensor 266 from the pressure chamber 292 and the fluid. A cable 274 extends from the sensor 266, through the potting 267, and terminates in an electrical connector 276.

FIGS. 16A–16C illustrate an alternative embodiment of a differential pressure gauge housing 456, which has a dry end formed with a collar 458 and a wet end formed with a sleeve 459. The collar has fluid and sensor portions 460 and 462. The fluid portion 460 has an outer diameter sized to be positioned in the upper fluid chamber 130 of the filter head 282. The outer diameter of the sensor portion 462 is greater than the outer diameter of the fluid portion 460. A radial shoulder 464 extends between the fluid and sensor portions 460 and 462 of the collar 458.

The collar 458 defines a fluid cavity 466 and a sensor chamber 468. The fluid cavity 466 is defined in the fluid portion 460 and the sensor chamber 468 is defined in the second portion 462. The fluid cavity 466 has inner and outer ends 472 and 474, and is formed by a generally cylindrical wall 470 having an inner surface 482. The sensor cavity 468 has inner and outer ends 478 and 480, and is formed by a generally cylindrical outer wall 476. An intermediate wall 481 is formed between the inner ends 472 and 478 of the fluid cavity 466 and the sensor chamber 468, respectively. In one embodiment, the thickness of the intermediate wall 304 is between about $\frac{1}{16}$ inch and about $\frac{3}{16}$ inch. In another embodiment the thickness is about $\frac{1}{8}$ inch.

The inner surface of the wall forming the fluid cavity 466 has a first portion 484 with a first inner diameter extending from the inner end 472 to a radial shoulder 486. A second portion 488 with a second, larger inner diameter extends from the radial shoulder 486 to the outer end 474. A rib 490 extends inward from the second portion 488 of the inner surface 482 and circumferentially around the fluid cavity 466. The rib 490 is sized and positioned to mate with a groove formed in the sleeve 459.

Threads 491 are formed in a portion of the outer surface of the wall 472 forming the collar's 458 fluid cavity 466 and extend from the radial shoulder 464. The threads 491 mate with threads formed on the inner surface of the upper fluid chamber 130 of the filter head 282. The length of the threaded portion 308 is shorter than the length of the fluid receiving portion 146 of the upper fluid chamber 130 in the housing 282.

Referring to FIGS. 16A–16C and 18, the sleeve 459, has a generally cylindrical wall 492, an inner surface 494 that defines a sleeve cavity 496, and first and second ends 498 and 500. The first end 498 of the sleeve 459 has a radial wall 502 that defines a fluid passage 504, which opens to the sleeve cavity 496. The cylindrical wall 492 has a recess 506 adjacent to the first end 498 of the sleeve 459 that extends circumferentially around the sleeve 459; the recess 506 provides a seat for an o-ring 508 that forms a seal to prevent fluid from leaking along the outer surface of the cylindrical wall 492. In one possible embodiment, the sleeve 459 is formed with glass-filled Nylon 6/6 that is 25%–40% glass.

The inner surface 494 has a first diameter along most of its surface and a second, smaller inner diameter at the recess 506. A radial shoulder 510 extends between the portion of the inner surface 494 with the first inner diameter and the second, smaller inner diameter. The cylindrical wall 492 also defines first and second elongated slots 512 and 514 that open to the second end 500 of the sleeve 459.

The outer surface 516 of the cylindrical wall 492 defines a groove 518 positioned adjacent the second end 500 of the sleeve 459. The groove 518 extends circumferentially around the cylindrical wall 492 and is sized and positioned to mate with the rib 490. The second end 500 of the sleeve 459 is inserted into the outer end 474 of the fluid cavity 466 so that the rib 490 mates with the groove 518 and the second end 500 of the sleeve 459 is adjacent to the radial shoulder 510 along the inner surface 494 of the wall 492. In this configuration, the rib 490 retains the sleeve 459 in place with friction and a snap-fit engagement. The elongated slots 512 and 514 allow the second end 500 of the sleeve 459 to compress without permanently kinking, crimping, or otherwise permanently deforming the cylindrical wall 492 while the sleeve 459 is snapped into engagement with the outer end 474 of the fluid cavity 466.

When the sleeve 459 is snapped into place in the collar 458, the sleeve cavity 496 and fluid cavity 466 are axially aligned and form a pressure chamber 520. The outer diameter of the sleeve 459 is smaller than the outer diameter of the wall 470 forming the fluid chamber 466. Accordingly, there is an annular cavity between the sleeve 459 and the wall of the upper fluid chamber 130 when the pressure gauge 456 is attached to the head 282. In this configuration, there is fluid communication from the low-pressure portion 530 of the pressure chamber 520, through the elongated slots 512 and 514, through the annular cavity, through the second passage 150, and to the output passage 120. Similarly, there is fluid communication from the high-pressure portion 528 of the pressure chamber 520, through the fluid passage 504, through the end portion of the upper fluid chamber 130, through the first passage 148, and to the input passage 118. The o-ring 544 prevents fluid from leaking from the first passage 148 to the second passage 150.

Additionally, the cylindrical wall 492 has a thickness that is substantially equal to the depth of the radial shoulder 486 along the inner surface 482 of the fluid cavity 466, and the first inner diameter of the sleeve 459 is substantially equal to the first inner diameter of the fluid cavity 466. This configuration provides a substantially consistent inner diameter for the pressure chamber 520 without any substantial gaps or ridges between the inner surface 494 of the sleeve's cylindrical wall 492 and the collar's inner surface 482 of the fluid chamber 466 that would impede the movement of a piston or the compression of a spring positioned within the pressure chamber 520.

A piston 522 is formed from a piston sleeve 524 and a magnet 526 positioned within and is encased by the piston sleeve 524. The piston 522 is positioned in the pressure chamber 520 and divides the pressure chamber 520 into a high-pressure portion 528 and a low-pressure portion 530. In one embodiment, the magnet 526 is generally cylindrical and has a centerline that is co-linear with the centerline of the pressure chamber 520. A fluid-receiving portion 534 of the pressure chamber 520 is defined between the radial shoulder 510 and the radial wall 502. An end 536 of the piston sleeve 524 has a concave surface 538 that opposes the fluid passage 504 in the radial wall 502 and provides a space to receive fluid. In one possible embodiment, the piston sleeve 524 is formed with glass-filled Nylon 6/6 that is 25%–40% glass.

Additionally, the piston sleeve 524 has a flange 540 radially extending from the outer surface of the piston sleeve 524 and positioned adjacent to the end 536 defining the concave surface 538. A circumferential groove 542 is defined in the outer edge of the flange 540. An o-ring 544 is seated within the groove 542. A cross-section of the o-ring 544 has upper and loser lips 546 and 548 forming a cup shape with the open end 550 of the cup facing the high-pressure portion 528 of the pressure chamber 520. In this configuration, pressure from the fluid urges lips 546 and 548 of the o-ring 544 against the surfaces of the pressure chamber 520 and the piston sleeve 524 and enhances the sealing-effect of the o-ring 544. In one possible embodiment, the o-ring 544 is formed with Teflon® brand material and is machined or compression molded. In another possible embodiment, the o-ring 544 is formed with perfluoroalkoxy and is injection molded.

A spring 532 is positioned in the pressure chamber 520 and extends between the intermediate wall 481 of the collar 458 and the flange 540. The spring 532 biases the piston 522 toward the radial shoulder 510, which prevents the piston 522 from traveling into the fluid-receiving portion 534 of the pressure chamber 520. In this configuration, locating the recess 506 in the cylindrical wall 492 adjacent to the first end 498 of the sleeve 459 does not subtract usable diameter (e.g., the first inner diameter of the fluid cavity 466) from the portion of the pressure chamber 520 along which the piston 522 travels and the diameter of the piston 522 is able to be maximized. In one possible embodiment, the diameter of the piston 522 at the flange 540 is between about 0.25 inches and about 0.62 inches. In another possible embodiment, is about 0.22 inches or larger. In another possible embodiment, the spring is formed with music wire or stainless steel.

Additionally, the sleeve 459 is injection molded with a plastic such as glass filled nylon, which provides a low-friction surface for the inner surface 494 of the cylindrical wall 492 with out additional machining steps to finish the surface. An advantage of having such a surface is that it is less expensive to manufacture, and the low-friction surface increases sensitivity and reduces hysteresis in movement of the piston 522 within the pressure chamber 520.

Referring to FIGS. 16A and 17, a circuit 552 has a hall-effect sensor 266 and other electrical components 556. The hall-effect sensor 266 has a surface 560 and a depth, d. The hall-effect sensor 544 is mounted on one side of a circular circuit board 558. In one possible embodiment, the other electrical components 556 are mounted on the opposite side of the circuit board 558 from the hall-effect sensor 266. Examples of such other electrical components 556 include discrete electrical components, memory, logical elements, and programmable circuits such as microprocessors. In this embodiment, the circuit board 558 can be inserted into the sensor cavity 468 and positioned so that the surface 560 of the hall-effect sensor 266 is positioned against or in close proximity to the intermediate wall 481. In another possible embodiment, at least some of the other electrical components 556 having a depth smaller than the depth d of the hall-effect sensor 266 are mounted on the same side of the circuit board 558 as the hall-effect sensor 266. In this alternative embodiment, the other electrical components 556 mounted on the same side of the circuit board 558 as the hall-effect sensor 266 do not provide an obstruction that prevents the hall-effect sensor 266 from being place against or in close proximity to the intermediate wall 481. An advantage of these configurations is that the hall-effect sensor 266 is positioned as close as possible to the piston magnet 526.

A connector 562 has fist and second portions 564 and 566. The first portion 564 has an open end 568 and the circular circuit board 558 is retained therein. The first portion 564 is sized to snuggly fit within the sensor cavity 468 so that the hall-effect sensor 266 is positioned against or in close proximity to the intermediate wall 481. The outer end 480 of the wall 476 forming the sensor cavity 468 is rolled or crimped to retain the connector 562 in place and to hold the hall-effect sensor 544 in place without substantial movement. The second portion 566 of the connector 562 defines a cavity 570 for receiving a mating connector (not shown). Electrical contacts 572 are insert molded into the connector 562 and are exposed to the cavity 570 for electrical connection to a mating connector (not shown). The electrical contacts 572 are also electrically connected to the circuit 552.

Figure 19:
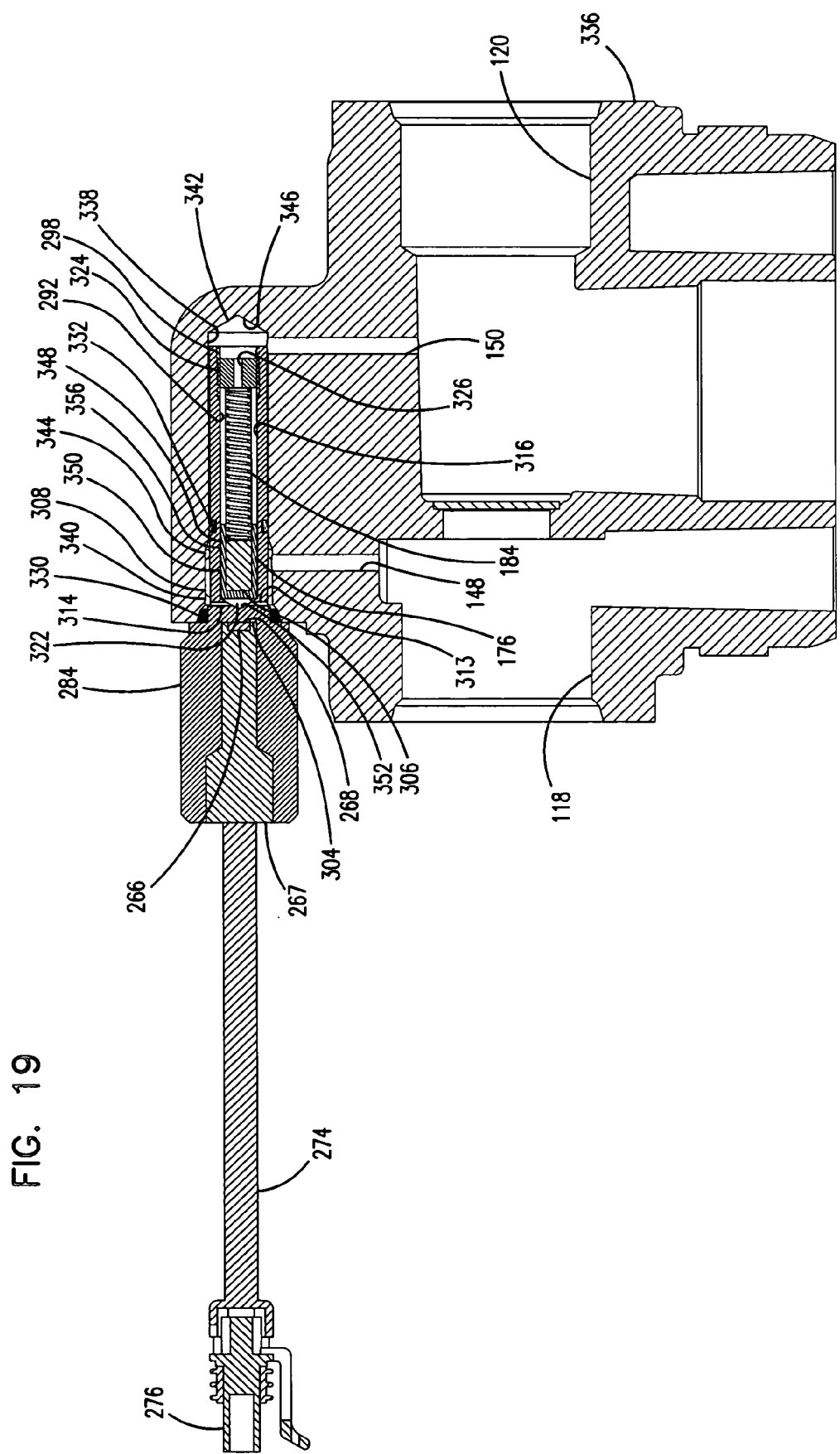
FIG. 19 is an alternative embodiment of the filter head and pressure differential gauge shown in FIG. 9.

FIG. 19 illustrates yet another alternative embodiment of a filter head 336, which is similar to the filter head 282, which his illustrated in FIG. 12.

The filter head 336 defines an input passage 118, an output passage 120, and first and second passages 148 and 150. The filter head 336 defines an upper fluid chamber 338 similar to the upper fluid chambers 130 described above. However, a first end 340 of the upper fluid chamber 338 is open and a second end 342 of the upper fluid chamber 130 is closed. A fluid receiving portion 344 is proximal the first end 340 of the upper fluid chamber 338.

A differential pressure gauge housing 284 includes pressure and sensor chambers 292 and 294, first and second portions 286 and 288, an intermediate wall 304, a radial shoulder 290, and a threaded portion 308. The threaded portion 308 is threaded to mating threads formed in the inner surface of the upper fluid chamber 338 of the filter head 336 and is sealed with o-rings 330 and 332.

First and second grooves 310 and 312 are formed in the threaded portion 308 of the differential pressure gauge housing 284. First and second holes 313 and 314 pass from the first and second grooves 310 and 312, respectively, to a concave surface 306 formed in an inner end 296 of the pressure chamber 292. In one embodiment, the first and second holes 313 and 314 are positioned as close as possible to the inner end 296 of the pressure chamber 292. Additionally, the outlet of the first passage 148 is in fluid communication with the first and second grooves 310 and 312.

A plug 324 is threaded into the outer end 298 of the pressure chamber 292. The plug 324 defines a fluid passage 326. The length of the first portion 286 of the pressure differential gauge housing 284 is sized so that when it is fully inserted in the upper fluid chamber 338 of the filter head 336, there is a gap 346 between the plug 324 and the second end 342 of the upper fluid chamber 338. The second passage 150 is in fluid communication with the gap 346.

A piston 348 is formed from a sleeve 350 and a magnet 176 positioned within the sleeve 350. The piston 348 has first end 352 formed by a flat wall. In one embodiment, the flat wall forming the first end 352 is between about 0.08 inch and about 0.25 inch. In another embodiment, the flat wall about 0.12 inch thick. A spring 184 extends between a second end 356 of the piston 348 and the outer end 298 of the pressure chamber 292. The spring 184 urges the piston 348 and the magnet 176 toward the intermediate wall 304.

The piston 348 divides the pressure chamber 292 into a high-pressure portion 322 and a low-pressure portion 316. In this configuration, fluid flows from the first passage 148, into the fluid receiving portion 146 of the upper fluid chamber 130, into the first and second grooves 310 and 312, through the first and second holes 313 and 314, and into the high-pressure portion 322 of the pressure chamber 292. In one embodiment, the outlet port of the first passage 148 is as close as possible to the first and second holes 313 and 314. In yet another embodiment, the outlet port is in direct fluid communication with at least one of the holes 313 and 314. Similarly, fluid from the second passage 180 flows into the gap 346, through the fluid passage 326 in the plug 324, and into the low-pressure portion 316 of the pressure chamber 292.

The sensor chamber 294 is similar to the sensor chamber 262 discussed above. A continuous output hall-effect sensor 266 is positioned within the sensor chamber 294 with the first, active face 268 opposing the intermediate wall 304. Additionally, the center of the first, active face 268 is aligned with the centerline of the magnet 176 and the pressure chamber 292. The hall-effect sensor 266 is potted 267 with an electrically non-conductive material such as an epoxy or urethane. This configuration isolates the hall-effect sensor 266 from the pressure chamber 292 and the fluid. A three wire cable 274 extends from the sensor 266, through the potting 267, and terminates in an electrical connector 276.

Figure 20:
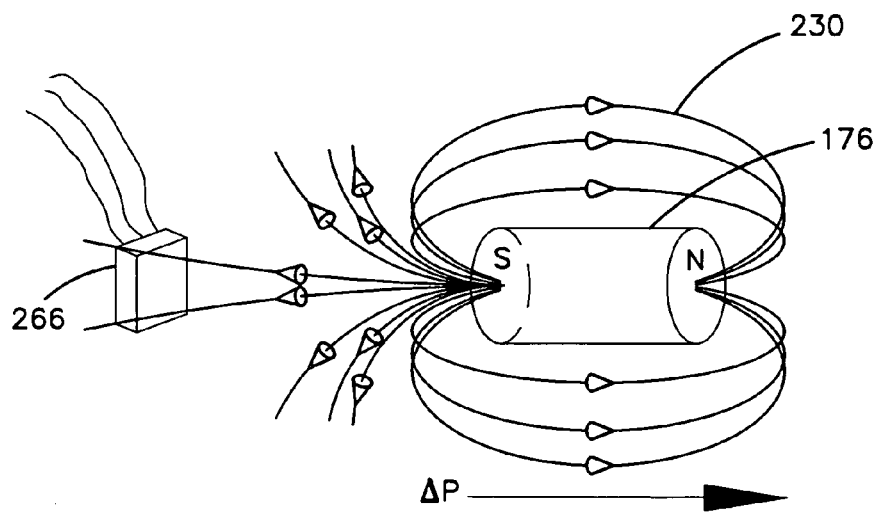
FIG. 20 illustrates a relationship between a magnet and a sensor illustrated in FIG. 19.

Referring to FIG. 20, the motion of the piston magnet 176 is reversed relative to the motion of the magnet 176 illustrated in FIG. 10. When there is no pressure differential, the magnet 176 is close to the hall-effect sensor 266. As the differential pressure increases, the fluid pressure in the high-pressure portion 322 of the pressure chamber 292 drives the piston 348, and hence the magnet 176 away from the sensor 266.

Similar to the hall-effect sensor 204, the output of the hall-effect sensor 266 can drive a variety of different analog or digital circuits or provide input for a variety of different programmable circuits. In one embodiment, as shown in FIG. 21, for example, the output of the hall-effect sensor 266 drives a circuit that that generates at least one discrete output. The exemplary circuit has an input 354, a first op amp 356, and a second op amp 358. The input 354 is in electrical communication with the output of the hall-effect sensor 266. The input is also in electrical communication with the noninverting input of the first op amp 356 via a 10 kΩ resistor and is in electrical communication with the noninverting input of the second op amp 358 via a 10 kΩ resistor.

The inverting input of the first op amp 356 is tied to a 5 volt power supply via a 1.5 kΩ resistor and to ground via a 3.5 kΩ resistor. The inverting input of the second op amp 358 is tied to a 5 volt power supply via a 750 Ω resistor and to ground via a 4.25 kΩ resistor. Additionally, the noninverting input and the output of the first op amp 356 are tied together with a 1 MΩ resistor, and the noninverting input and output of the second op amp 358 are tied together with a 1 MΩ resistor.

In this circuit, the first op amp 356 is in a normally low state, but jumps to a high state of 5 volts when the voltage of the signal output by the hall-effect sensor 266 reaches 3.5 volts. The second op amp 358 is also in a normally low state, but jumps to a high state of 5 volts when the voltage of the signal output by the hall-effect sensor 266 reaches 4.25 volts. Each op amp 356 and 358 provides a discrete output that correlates or corresponds to a differential pressure and is indicative of the condition of a filter. In use, when the filter element 160 is reaching the end of its useful life, the output of the first op amp 356 will change from a low state to a high state. When the filter element 160 fails or has reached the end of its useful life, the output of the second op amp 358 will change states from a low state to a high state. In other embodiments, the circuit includes only a single op amp, which would provide information regarding one differential pressure. Alternatively, the circuit could include more than two op amps, which would provide information about more than two differential pressures.

The output of the first and second op amps 356 and 358 can input into a programmable circuit such as a computer or an engine control module that controls the machine, activates an alarm, and/or records data. Alternatively, the outputs of the first and second op amps 356 and 358 can drive amber and red LED's 360 and 362, respectively, which provide visual warning lights.

Figure 22:
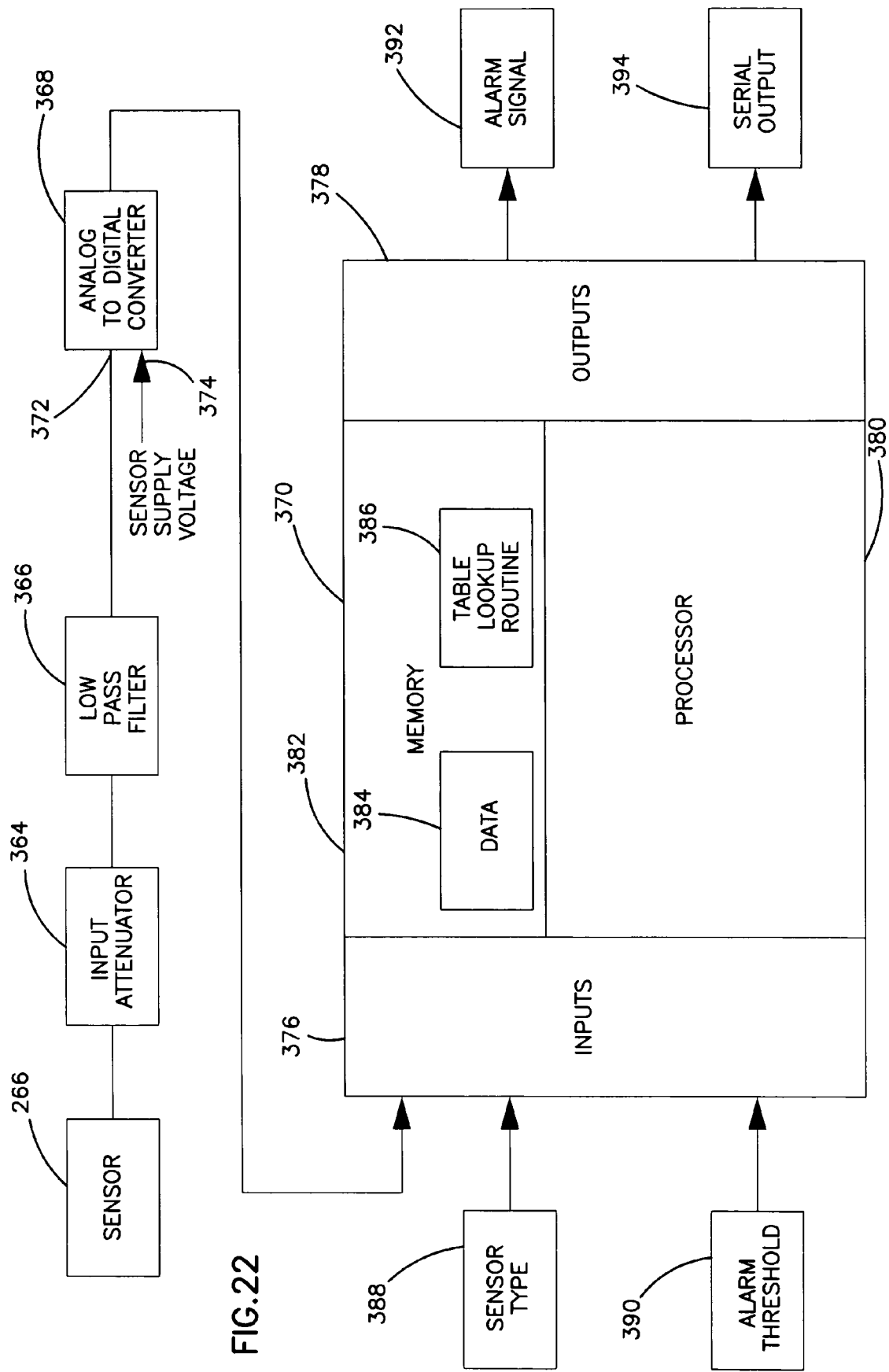
FIG. 22 illustrates one circuit that can process signals output from the sensors illustrated in FIGS. 6, 10, and 21.
Figure 24A:
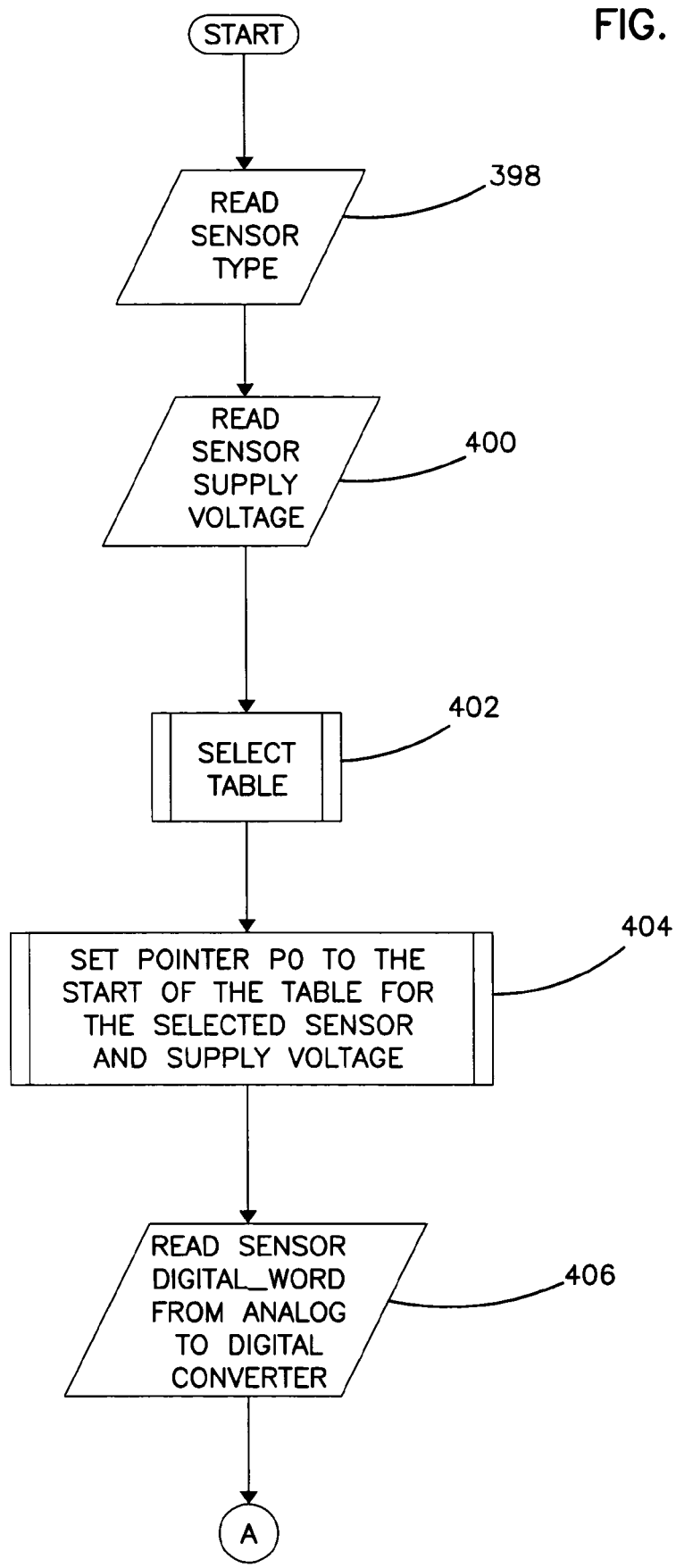
FIGS. 24a–24f is a flow chart illustrating operations of a look up table routine stored in an executable by the microcontroller illustrated in FIG. 22.
Figure 24B:
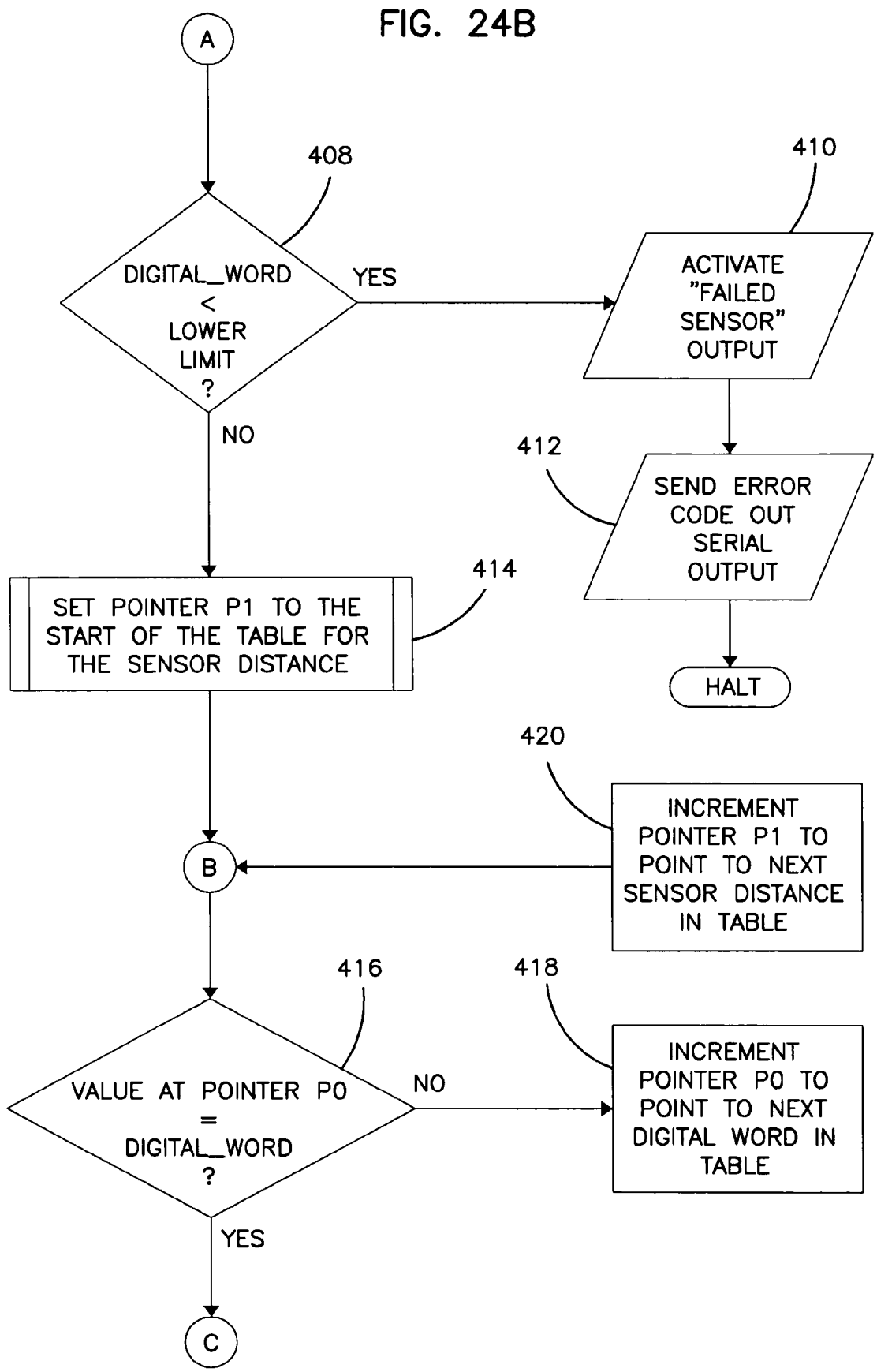
Figure 24C:
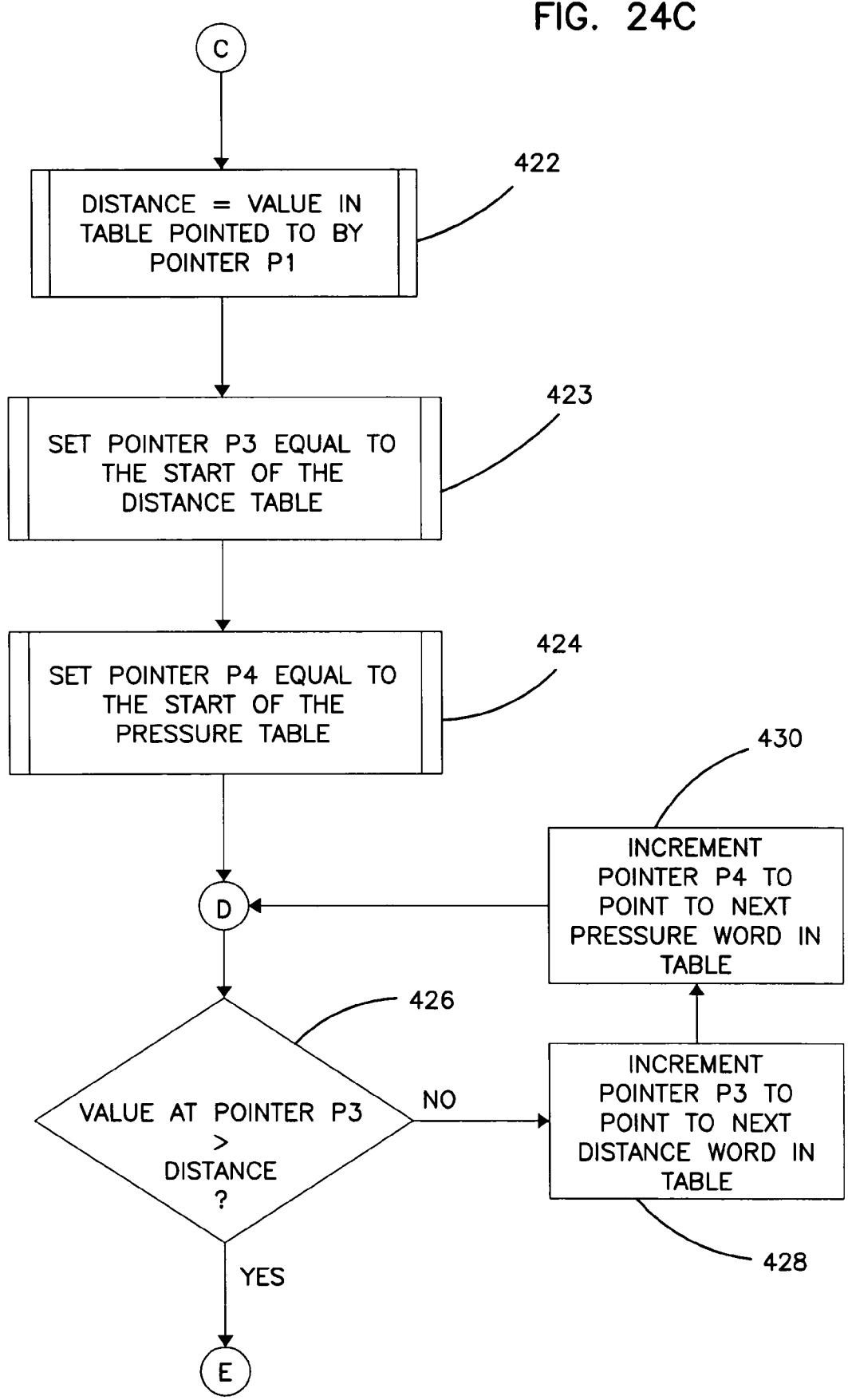
Figure 24D:
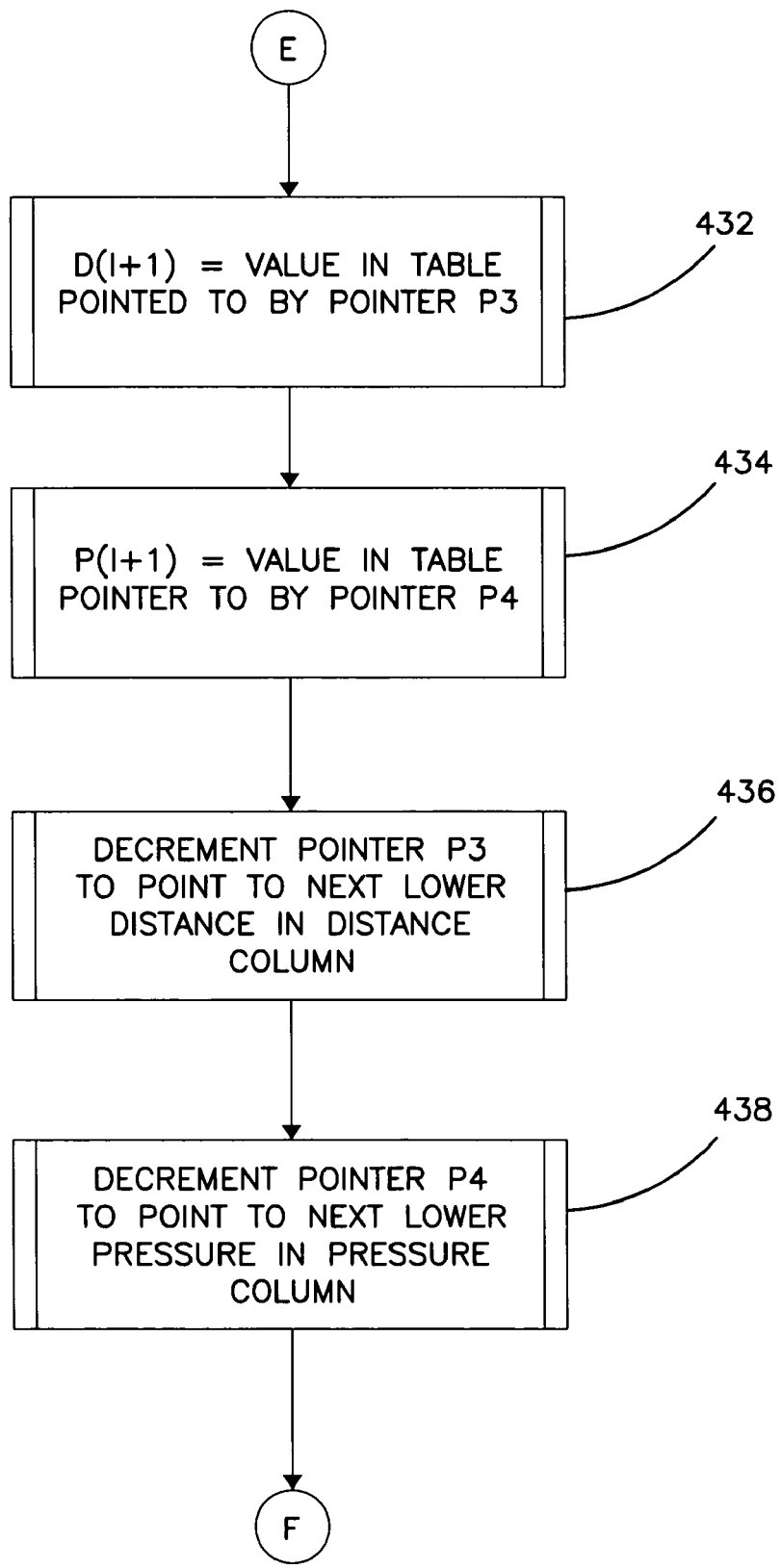
Figure 24E:
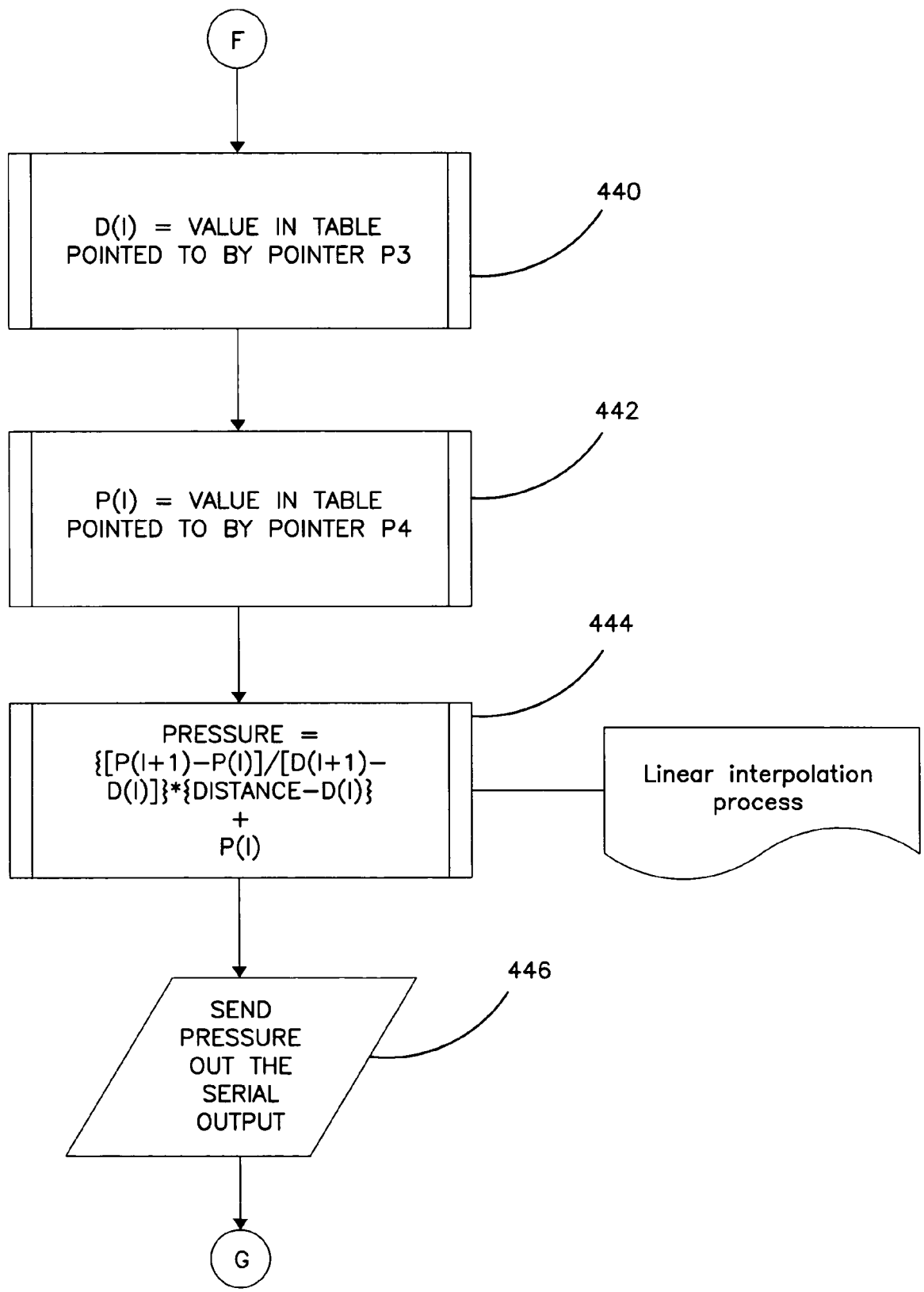
Figure 24F:
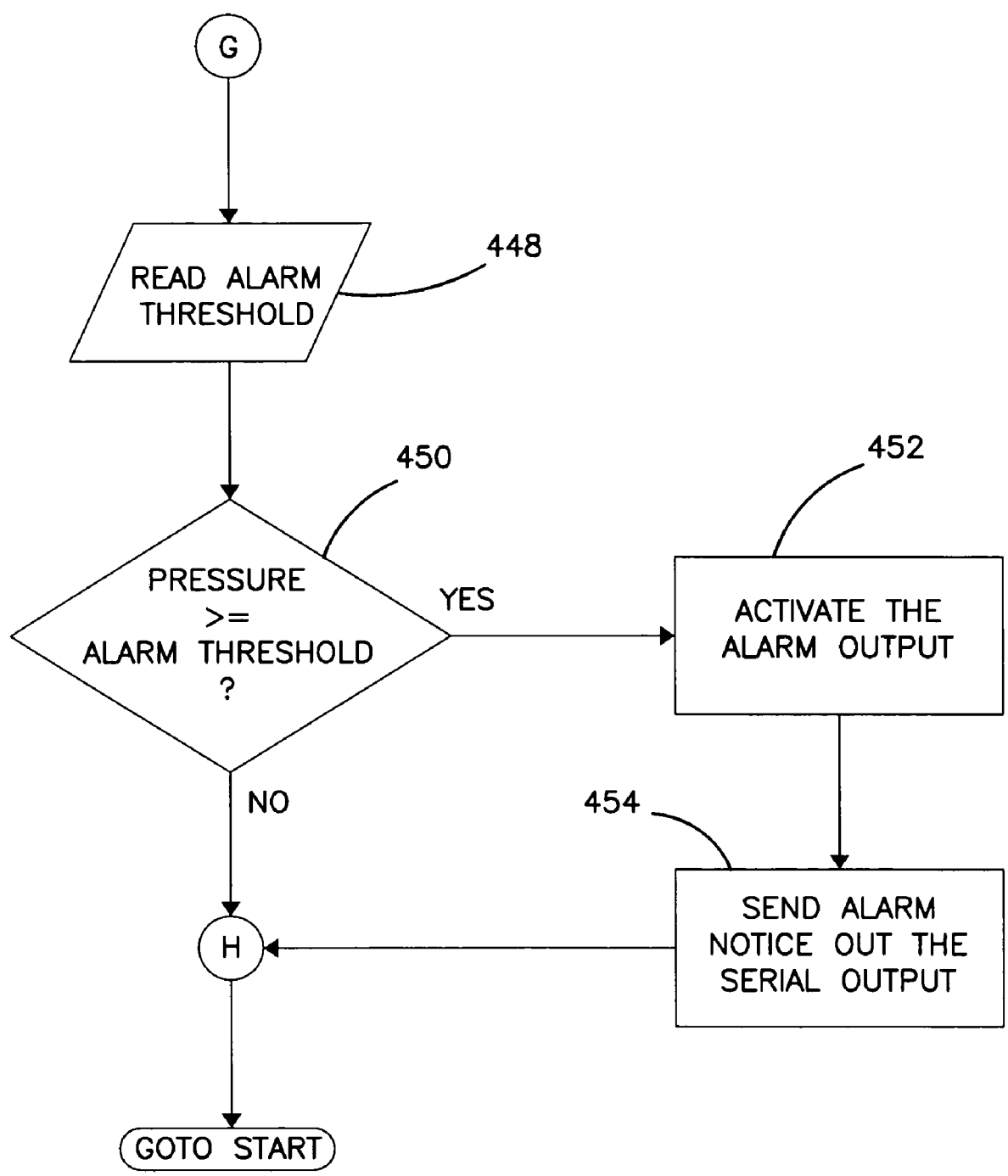

FIG. 22 illustrates another circuit that can process the signal output by the continuous output hall-effect sensor

266. This circuit includes an attenuator 364, a low-pass filter 366, an analog-to-digital (A/D) converter 368, and a microcontroller 370. The A/D converter 368 can be multiplexed between two inputs 372 and 374. The microcontroller 370 includes input circuitry 376, output circuitry 378, processing circuitry 380, and memory 382. The memory 382 is loaded with lookup tables 384 and a lookup table routine 386.

During operation of the programmable circuit, the output signal generated by the hall-effect sensor 266 is passed through the attenuator 364 to attenuate or scale the voltage of the signal so that its maximum value is between 0 and 5 volts. The signal is then filtered 366, which reduces any oscillations or spikes in the signal. Oscillations and spikes in the signal can result from rapid movement in the piston caused by sudden movement in, or impacts to, the filter assembly. Additional filtering can be performed in software executed by the microcontroller 370. The filtered signal is input into the first input 372 of the A/D converter 368.

The voltage of the power supply for hall-effect sensor is input into the second input 374 of the A/D converter 368. The output of the A/D converter 368 is then input into the microcontroller 370. In one embodiment, additional inputs into the microcontroller 370 include a binary code or digital word that identifies the sensor type 388 and a binary code or digital word that sets an alarm threshold 390. A variety of structures can be used to input the sensor type and alarm threshold. Examples of inputs include dip switches and jumpers. In another embodiment, the identity of the sensor and the alarm threshold also can be downloaded into the microcontroller 370 electronically and stored in memory 382.

Additionally, there might be a variety of alarm threshold values stored in memory 382 and used by the lookup table routine 386. For example, one alarm threshold might correspond to a warning that signals the filter element 160 is approaching the end of its useful life and should be changed. Another alarm threshold might correspond to a failure of the filter element 160. Other embodiments include other inputs or no inputs at all. For example, a microcontroller programmed to interface with only one particular type of sensor does not need an input that identifies the sensor.

The microcontroller 370 has several outputs including an alarm output 392 and a serial output 394. The alarm output 392 is configured to send an alarm signal. In one possible, embodiment, the alarm signal will cause a warning light to illuminate. The serial output 394 is configured to communicate a signal to other programmable devices such as a computer or an engine control module for vehicles. Examples of other computers include an onboard computer for vehicles and a computer controller for manufacturing equipment. Additionally, these other computers can perform a variety of functions such as diagnostics, collection and recordation of data, the generation of alarm conditions, or even disabling an engine or a pump.

Communication through the serial output 394 can be over a dedicated link, a data bus, or radio frequency (Rf) transmission. Furthermore, other embodiments include programmable circuits such as microprocessors or programmable logic arrays in place of the microcontroller.

In yet other embodiments, the memory 382 of the microcontroller 370 is used to store data as well as look up tables 384 and code for the lookup table routine 386. For example, various alarm conditions and the value of various sensor outputs might be recorded in memory 382 and downloaded at a later time. In another example, circuitry different than that illustrated in FIG. 21 is used to condition the sensor signal before it is input in the microcontroller.

Referring to FIGS. 23A and 23B, two sets of lookup tables 396*a* and 396*b* are stored in memory. The first set of lookup tables includes a plurality of tables. Each table 384*a* relates a sensor output voltage to the distance between the sensor and the piston magnet for a given sensor type and a given voltage supply. An advantage of having a plurality of tables is that both the sensitivity of a sensor and signal strength of a sensor's output will vary on the sensor's make, model, and supply voltage. As a result, a single microcontroller can be used with a variety of different sensors, which simplifies manufacturing and inventory requirements.

Each table 384*a* within the first set of lookup tables 396*a* include a two column array of data that correlates the sensor output voltages to the displacement of the piston in the pressure chamber. Each column includes data words that range from word(O) to word(N), and are ordered such that word(I+1)>word(I). A first pointer P0 points to data in the first column of the table in the first set of tables, and a second pointer P1 points to data in the second column of the first set of tables.

The second set of tables 396*b* includes a single table 384*b* that relates the differential pressure to the distance between the sensor and the piston magnet. Only a single table 384*b* is required because the relationship between the differential pressure and the piston of the piston magnet does not depend on the type of hall-effect sensor that is used. In an alternative embodiment, however, the second set of tables can include multiple sets of tables if a single microcontroller is used with different differential pressure gauges.

The second table 384*b* also is a two column array of data that correlates the displacement of the piston in the pressure chamber to the actual pressure differential. Each column includes data word that range from word(O) to word(N), and are ordered such that word(I+1)>word(I). A third pointer P2 points to data in the first column of the table in the second set of tables, and a fourth pointer P3 points to data in the second column of the second set of tables.

Many alternative embodiments of the tables are possible. For example, a microcontroller that has a design dedicated to a single sensor can include a single lookup table that relates sensor output voltage to pressure. Yet other embodiments might calculate the differential pressure from the sensor output and not include any lookup tables. Yet other embodiments might merely record data or set alarm conditions without determining differential pressures.

FIGS. 24A–24F illustrate the operation of the lookup table routine. Generally, programmed operations perform a particular task. Operation 398 reads the sensor type 388 from the binary input code, and operation 400 outputs a signal to the A/D converter 368 that selects the second input 374. The A/D converter 368 then converts the sensor's supply voltage and inputs the digital word corresponding to that voltage into the microcontroller 370. Operation 402 selects the table 384*a* from the first set of tables 396*a* that corresponds to that sensor and supply voltage. Operation 404 then sets pointer P0 to the start of the first column in the first table 384*a* and outputs another signal to the A/D converter 368 that selects the first input 372, which corresponds to the signal output from the hall-effect sensor. The A/D converter 368 then converts the signal output from the sensor. Operation 406 reads the digital word output by the A/D converter 368 that corresponds to the sensor output.

Hall-effect sensors typically output a signal having a nominal value even when they are not exposed to a magnetic signal. Accordingly, operation 408 determines whether the value of the sensor output is below the typical nominal value. If the signal is below the nominal value, operations 410 and 412 generate an error signal and output the error signal. The computer or engine control module that interfaces with the microcontroller 370 then receives the signal and takes appropriate steps such as activating a warning signal or disabling an engine.

If the signal output by the hall-effect sensor is equal to or greater than the nominal output level, operation 412 sets pointer P1 to the start of the second column, which corresponds to sensor distance. Operations 416–420 increment pointers P0 and P1 until the value of the digital word at pointer P0 equals the value of the digital word received from the A/D converter 368. These operations also ensure that pointers P0 and P1 are aligned. Operation 422 sets the value of a variable distance equal to the value pointed to by pointer P1.

Operations 423 and 425 set pointers P2 and P3 to start of the distance column and the pressure column, respectively, in the second table 384b. Operations 426–430 then align and increment pointers P2 and P3 until the value at pointer P3 equals is greater than the value of the variable distance. Operation 423 then sets the value of a variable D(I+1) equal to the value at pointer P3, and operation 20 sets the value of the variable P(I+1) equal to the value at pointer P4.

After the value of variable D(I+1) is set, operation 436 decrements the pointer P3 so that it points to the next lower distance in the distance column. Similarly, operation 438 decrements the pointer P4 so that it points to the next lower pressure in the distance column. After the pointers P3 and P4 are decrements, operation 440 then sets the value of variable D(I) to equal the value in the table at pointer P3. Similarly, operation 442 sets the value of variable P(I) to equal the value in the table at pointer P4. After the value of the variables are set, operation 444 uses a linear interpolation to calculate the pressure. The equation used in the interpolation is:

PRESSURE={[P(I+1)−P(I)]/[D(I+1)−D(I)]}*{DISTANCE−D(I)}+P(I).

In one embodiment, operation 446 then communicates the calculated value of PRESSURE over the serial bus to a computer, which records the data for historical and diagnostic purposes. Alternatively, the value of the variable PRESSURE is locally stored in the memory of the microcontroller so that it can be downloaded at a latter time. Additionally, operations 448 and 450 read the alarm threshold 390 and compare it to the value of the variable PRESSURE. If the value of the variable PRESSURE is equal to or greater than the alarm threshold 390, operations 452 and 454 generate and output an alarm signal 392. The alarm signal 392 then activates an alarm such as a warning lamp.

Many different embodiments of the lookup table routine 386 are also possible. For example, one embodiment does not use interpolation to determine the pressure. In this embodiment, every digital word in the second column of the first table has a matching value in the first column of the second table. The lookup table routine 386 merely indexes the third and fourth pointers P3 and P4 until the value at P3 matches the value at the second pointer P2. The measured differential pressure is the corresponding differential pressure at the pointer P4.

In another possible embodiment, the microcontroller 370, or any other programmable circuit such as a microprocessor used for processing the output of the hall-effect sensor 266 or within the circuit of a programmable hall-effect sensor itself, is programmed with an algorithm to correct the effect of hysteresis on movement of the piston. Referring to FIG. 24, when a differential pressure increases 578, the piston moves one direction. As the differential pressure decreases 580, the piston moves in the opposite direction. However, hysteresis may result in the hall-effect sensor 266 output different voltages $V_{p1}$ and $V_{p2}$ for a given differential pressure $\Delta P$ depending on whether the pressure differential is increasing or decreasing, respectively, and hence the piston is moving one direction or another. For a given pressure differential $\Delta P$, the piston does not tend to return all the way to the position it had while the differential pressure was increasing. Accordingly, for a given pressure differential $\Delta P$, the hall-effect sensor 266 outputs a signal with greater amplitude $V_{p2}$ when the differential pressure is decreasing 580 than when the differential pressure is increasing 578.

Referring to FIGS. 21 and 24, the hall-effect sensor 266 outputs a sensor voltage $V_p$, the amplitude of which varies with the distance of the magnetic piston from the hall-effect sensor 266. The sensor voltage $V_p$ is converted to a digital signal and input to the microcontroller 370, which processes the sensor voltage $V_p$ and generates an output voltage $V_{out}$ indicative of whether the pressure differential is above or below a checkpoint voltage $V_{chpt}$, which is a predetermined value. In one possible embodiment, the microcontroller 370 is programmed to step its output $V_{out}$ from a first voltage $V_{out1}$ such as a low voltage to a second voltage $V_{out2}$ such as a higher voltage when the sensor output reaches the checkpoint voltage $V_{chpt}$.

The microcontroller 370 is also programmed with an offset voltage $V_{off}$, which the microcontroller 370 uses in a hysteresis algorithm to compensate for hysteresis in movement of the piston. The offset voltage $V_{off}$ is experimentally determined and corresponds to the voltage differential in the sensor voltage that occurs for a given differential pressure $\Delta P$ when the differential pressure is increasing 578 versus when the differential pressure is decreasing 580.

Figure 25:
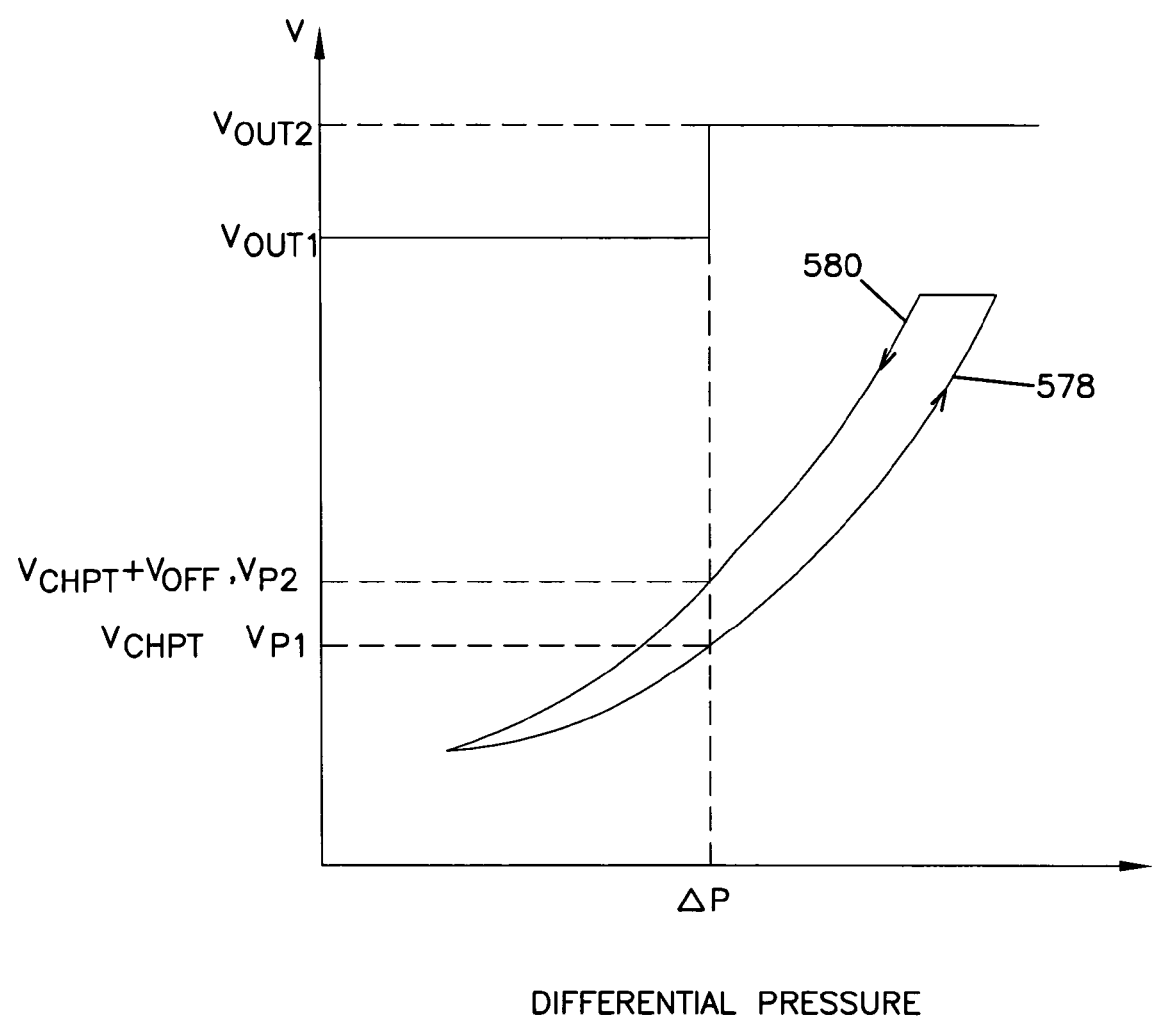
FIG. 25 is a chart illustrating the effect of hysteresis and the output of a sensor circuit.
Figure 26A:
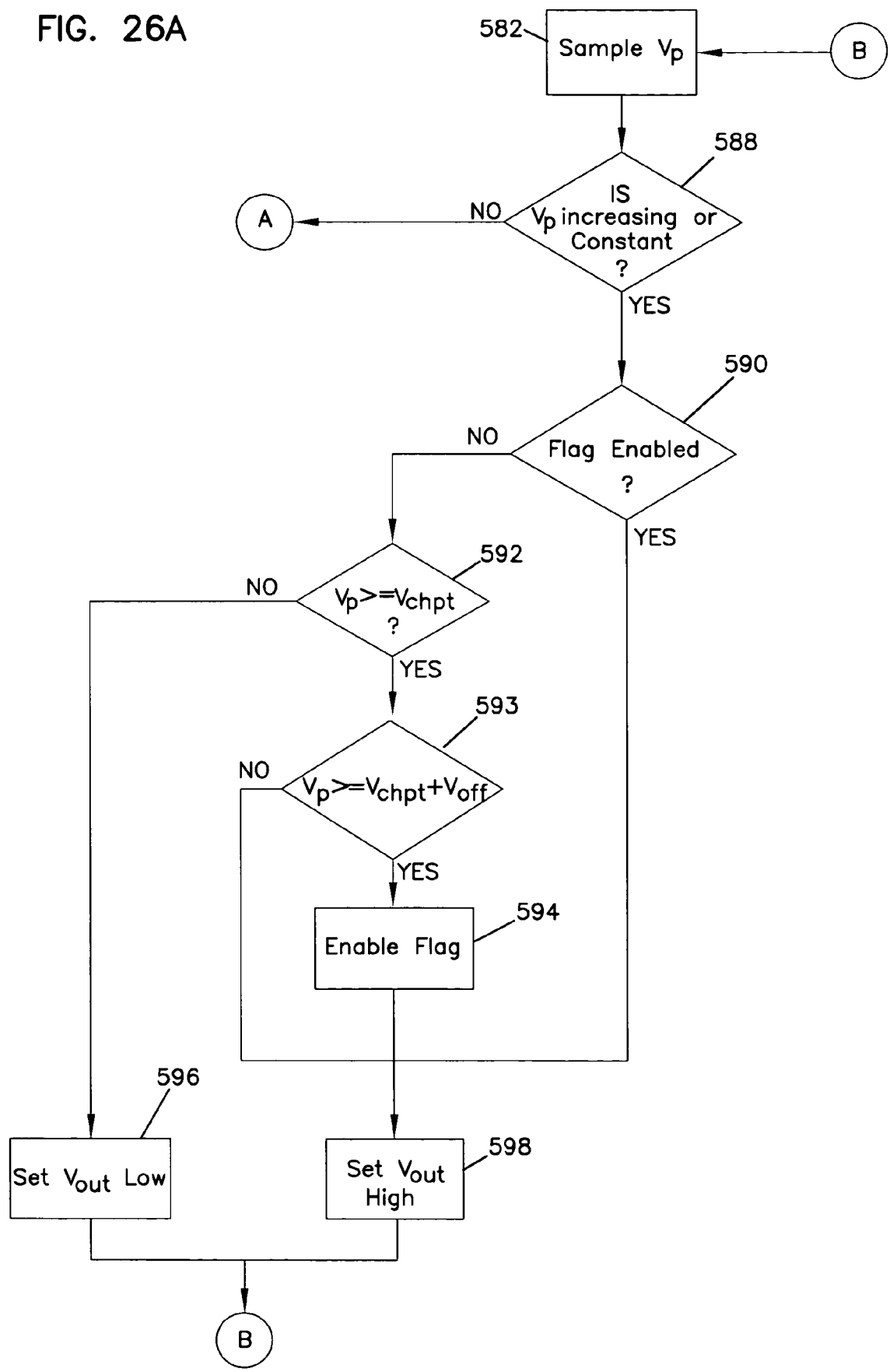
FIGS. 26A and 26B is a flow chart of a hysteresis algorithm.
Figure 26B:
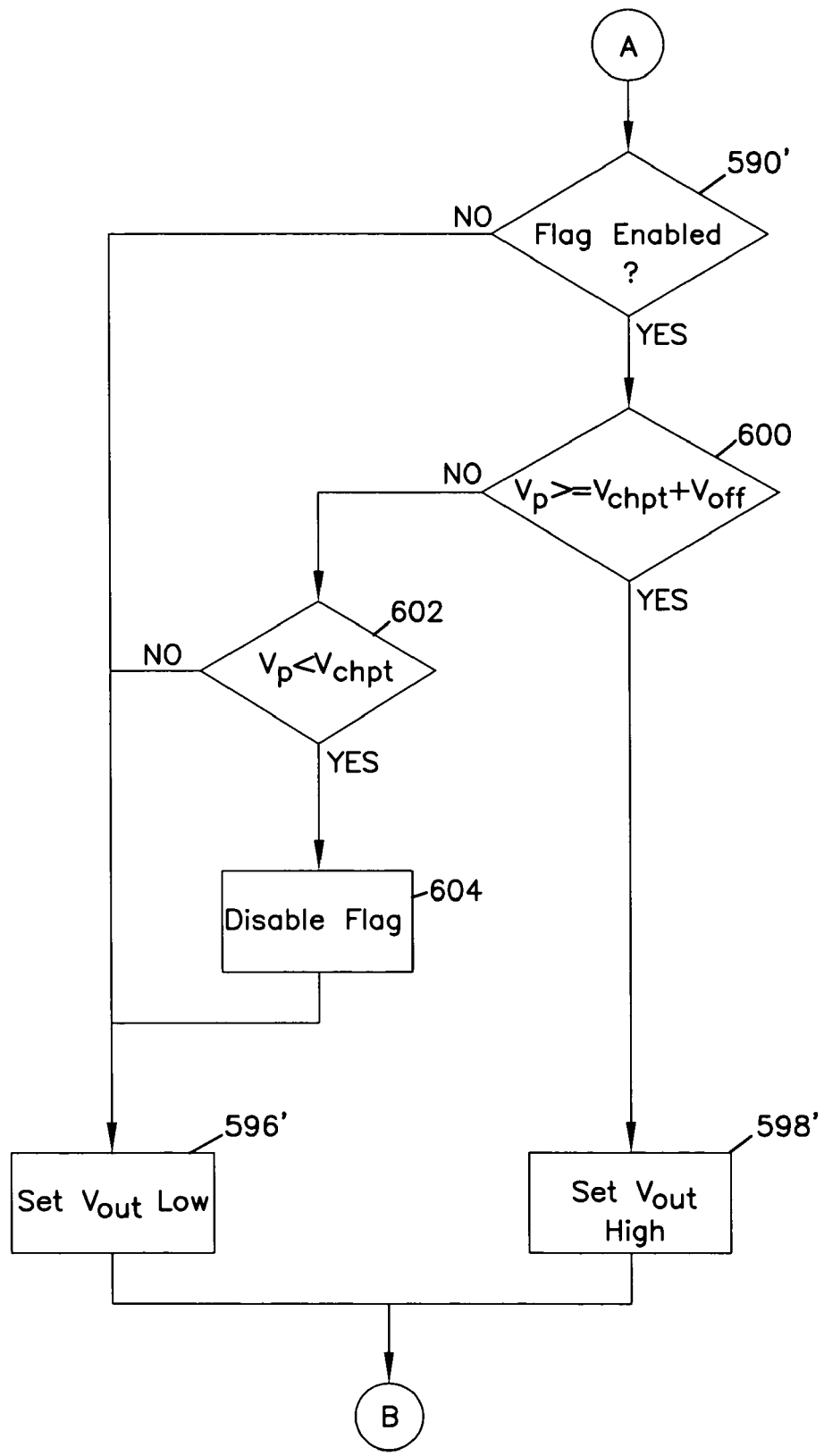

Referring now to FIGS. 25, 26A, and 26B the hysteresis algorithm samples the sensor voltage at operation 582. In one possible embodiment, the microcontroller 370 calculates the output voltage $V_p$ as a running average of the 16 most current samples. Utilizing a running average for the samples and the offset voltage $V_{off}$ provide a filter to prevent the microcontroller from changing its output in response to noise such as aberrant spikes or dips in the differential pressure.

Operation 584 compares the sum of the checkpoint voltage $V_{chpt}$ and the offset voltage $V_{off}$. If the sum of the checkpoint voltage $V_{chpt}$ and the offset voltage $V_{off}$ is less than or equal to the sensor voltage $V_p$, the microcontroller 370 does not step the output voltage and continues to sample the output of the hall-effect sensor 266. If the sum of the checkpoint voltage $V_{chpt}$ and the offset voltage $V_{off}$ is greater than the sensor voltage, operation 586 sets a hysteresis flag.

If the offset voltage $V_p$ and hence the differential pressure are increasing, the operation 590 determines whether the hysteresis flag is enabled. If the hysteresis flag is enabled, operation 598 sets the output voltage $V_{out}$ to a high level. If the hysteresis flag is not enabled, the operation 592 compares the sensor voltage $V_p$ to the checkpoint voltage $V_{chpt}$. If the sensor voltage $V_p$ is less than the checkpoint voltage $V_{chpt}$, operation 596 sets the output voltage $V_{out}$ to the first level or maintains the output voltage $V_{out}$ at the first level if it is already at that level.

If the sensor voltage $V_p$ is equal to or greater than the checkpoint voltage $V_{chpt}$, operation 593 compares the sensor voltage $V_p$ to the sum of the checkpoint voltage $V_{chpt}$ and the offset voltage $V_{off}$. If the sensor voltage $V_p$ is less than the sum of the checkpoint voltage $V_{chpt}$ and the offset voltage $V_{off}$, operation 598 sets the output voltage $V_{out}$ of the microcontroller 370 to the second level or maintains the output voltage $V_{out}$ at the second level if it is already at that level. If the sensor voltage $V_p$ is greater than or equal to sum of the checkpoint voltage $V_{chpt}$ and the offset voltage $V_{off}$, operation 594 enables the hysteresis flag and then operation 598 sets the output voltage $V_{out}$ of the microcontroller 370 to the second level or maintains the output voltage $V_{out}$ at the second level if it is already at that level.

If operation 588 determines that the sensor voltage is decreasing, operation 590' determines whether the hysteresis flag is set. If the hysteresis flag is not set, operation 596' sets the output voltage $V_{out}$ to the first level or maintains the output voltage $V_{out}$ at the first level if it is already at that level. If the hysteresis flag is set, operation 594' compares the sensor voltage $V_p$ to the checkpoint voltage $V_{chpt}$. If the sensor voltage $V_p$ is greater than or equal to the sum of the checkpoint voltage $V_{chpt}$ and the offset voltage $V_{off}$, operation 598' sets the output voltage $V_{out}$ of the microcontroller 370 to the second level or maintains the output voltage $V_{out}$ at the second level if it is already at that level.

If the sensor voltage $V_p$ is less than the sum of the checkpoint voltage $V_{chpt}$ and the offset voltage $V_{off}$, operation 602 compares the sensor voltage to the checkpoint voltage $V_{chpt}$. If the sensor voltage $V_p$ is less than the checkpoint voltage $V_{chpt}$, operation 596' sets the output voltage $V_{out}$ to the first level or maintains the output voltage $V_{out}$ at the first level if it is already at that level. If the sensor voltage $V_p$ is greater than or equal to the checkpoint voltage $V_{chpt}$, operation 604 disables the hysteresis flag and then operation 596' sets the output voltage $V_{out}$ to the first level or maintains the output voltage $V_{out}$ at the first level if it is already at that level.

An alternative embodiment of the hysteresis algorithm sets two or more checkpoint voltages $V_{chpt}$ and corresponding offset voltages $V_{off}$. In this embodiment, each checkpoint voltage $V_{chpt}$ and offset voltage $V_{off}$ can be used when identifying the occurrence of different events. For example, a first checkpoint voltage $V_{chpt1}$ and offset voltage $V_{off1}$ might be used to determine when to generate a warning signal (e.g., an indication the differential pressure is approaching a failure level for the filter) and a second checkpoint voltage $V_{chpt2}$ and offset voltage $V_{off2}$ might be used to generate a failure signal (e.g., an indication the differential pressure has reached the failure point for the filter).

The various embodiments described herein are exemplary only, and many different embodiment are possible. For example, the differential pressure gauge can use any other structure other than a piston to gauge the pressure differential. Examples of such other structures include membranes and diaphragms. The differential pressure gauge described herein can also be used with filters that are adapted for back flow trough the filter element.

Additionally, any other sensor or measurement device that measures the displacement of a gauging structure and outputs an electrical signal can be used in place of a hall-effect sensor. For example, other types of sensors that can be used with a pressure differential gauge includes sensors made with gigantic magnetoresistive (GMR) materials. Yet other embodiments might include a completely electronic arrangement for measuring the pressure differential across a filter element and output a variable signal. Electrical signals can include any signal that can be detected and processed by another piece of equipment such as electrical signals, radio frequency signals, and light signals.

Additionally, other embodiments of the hall-effects sensors can be used. For example, one embodiment uses two single output hall-effect sensors, one responsive to positive flux and the other responsive to negative flux. The two hall-effect then can be spaced along the path of the magnet to eliminate the dead zone in the response of the dual output hall-effect sensor described above. Another example of an alternative hall-effect sensor is a programmable-type of hall-effect sensor that can be programmed or calibrated to output a certain voltage given a particular relative position of a magnet. An advantage of such a device is accuracy, the programming can account for spring variations, magnet variations, and sensor orientation. An example of such a programmable hall-effect sensor is model no. A3150, which is a prototype being developed by Allegro MicroSystems.

Furthermore, embodiments having a perpendicular sensor arrangement as described above are not limited to only hall-effect sensors having a discrete output. Similarly, embodiments having a parallel sensor arrangement as described above are not limited to only hall-effect sensors having a continuous output. Still other embodiments of the hall-effect sensors described above are possible. For example, other embodiment might use a hall-effect sensor that has a normally high output. An advantage of this structure is that any computer that interfaces with the hall-effect sensor can more easily determine that there is a sensor failure when fluid is not flowing by merely checking the sensor output.

The foregoing description of various embodiments has been presented for purposes of illustration and description, and is not intended to be exhaustive or to limit the invention to the precise form disclosed. It is intended that the scope of the invention not be limited by the specification, but defined by the claims set forth below.

The claimed invention is:

1. An apparatus for measuring the differential pressure of fluid in filter, the apparatus comprising:
   a housing defining a pressure chamber;
   a magnet positioned within the chamber;
   a circuit board; and
   a circuit mounted on the circuit board, the circuit having a hall-effect sensor responsive to the magnet, a first set of electrical components, and a second set of electrical components, the hall-effect sensor being mounted on one side of the circuit board and the first set of electrical components being mounted on an opposite side of the circuit board, the second set of electrical components mounted on the same side of the circuit board as the hall-effect sensor, wherein the depth of the hall-effect sensor is greater than or equal to the depth of each electrical component in the second set of electrical components.

2. The apparatus of claim 1 wherein the hall-effect sensor has a surface substantially parallel to the circuit board and the surface is positioned against the housing.

3. The apparatus of claim 2 wherein the circuit board is round.

4. The apparatus of claim 3 wherein the first set of electrical components includes more than one electrical component.

5. The apparatus of claim 1 wherein the hall-effect sensor has a surface substantially parallel to the circuit board and the surface is positioned proximal to the housing.

6. The apparatus of claim 1 wherein the second set of electrical components includes more than one electrical component.

7. An apparatus for measuring the differential pressure of fluid in filter, the apparatus comprising:
 a sensor assembly including a housing and a sensor positioned within the housing, the sensor being responsive to magnetic fields;
 a fluid assembly including a sleeve and a magnetic piston, the sleeve defining at least a portion of a pressure chamber, the magnetic piston positioned within the pressure chamber, the magnetic piston dividing the pressure chamber into a high-pressure portion and a low-pressure portion, the sleeve being formed with plastic.

8. The apparatus of claim 7 wherein the sleeve is snap fit to the housing.

9. The apparatus of claim 8 wherein the sleeve defines a circumferential groove and the housing defines a circumferential rib, the groove and rib arranged to mate.

10. The apparatus of claim 9 wherein the sleeve is formed with a material selected from Nylon.

11. The apparatus of claim 7 wherein the sleeve has an attachment end, the attachment end configured for attachment to the housing, the sleeve defining one or more first openings, the one or more first openings extending from the attachment end.

12. The apparatus of claim 11 wherein the sleeve has on opposite end, the opposite end defining an opening, the opening being in fluid communication with the pressure chamber on one side of the piston and the one or more first openings being in fluid communication with the pressure chamber on the opposite side of the piston.

13. A method of measuring differential pressure in a filter head, the filter head including a differential pressure gauge, the differential pressure gauge including a magnetic piston and a hall-effect sensor and a circuit, the hall-effect sensor output a sensor voltage in response to the magnetic piston, the circuit outputting an output voltage in response to the senor voltage, the method comprising:
 moving a magnetic piston in one direction while the differential pressure is increasing and in an opposite direction when the differential pressure is decreasing;
 generating a sensor voltage, the amplitude of the sensor voltage corresponding to the position of the magnetic piston;
 generating an output voltage in response to the sensor voltage; and
 adjusting the output voltage to compensate for hysteresis in movement of the magnetic piston.

14. The method of claim 13 wherein adjusting the output voltage includes stepping the output voltage from a first amplitude to a second amplitude when the sensor voltage reaches a first predetermined level and the differential pressure is increasing, and wherein the circuit steps the output voltage from the second level to the first level when the sensor voltage reaches an amplitude substantially equal to the first predetermined level plus a first predetermined offset voltage when the differential pressure is decreasing.

15. The method of claim 14 wherein adjusting the output voltage further includes stepping the output voltage from the second amplitude to a third amplitude when the sensor voltage reaches a second predetermined level and the differential pressure is increasing, and wherein the circuit steps the output voltage from the third level to the second level when the sensor voltage reaches an amplitude substantially equal to the second predetermined level plus a second predetermined offset voltage when the differential pressure is decreasing.

16. The method of claim 15 wherein generating a sensor voltage includes sampling the output of the hall-effect sensor and calculating a running average of a predetrmined number of the most recent samples.

17. The method of claim 13 further comprising:
 enabling a hysteresis flag when the sensor voltage is greater than a checkpoint voltage plus an offset voltage; and
 disabling the hysteresis flag when the sensor voltage is less than the checkpoint voltage.

18. The method of claim 17 further comprising setting the output voltage to a high state when the sensor voltage is greater than the checkpoint voltage.

19. The method of claim 18 further comprising setting the output voltage to a high state when the hysteresis flag is enabled.

20. The method of claim 19 further comprising setting the output voltage to a low state when the hysteresis flag is disabled.

* * * * *